(12) United States Patent
Kakuwa et al.

(10) Patent No.: US 12,553,424 B2
(45) Date of Patent: Feb. 17, 2026

(54) COMPRESSION APPARATUS

(71) Applicant: Panasonic Intellectual Property Management Co., Ltd., Osaka (JP)

(72) Inventors: Takashi Kakuwa, Osaka (JP); Hiromi Kita, Nara (JP); Osamu Sakai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 258 days.

(21) Appl. No.: 18/302,092

(22) Filed: Apr. 18, 2023

(65) Prior Publication Data

US 2023/0313788 A1    Oct. 5, 2023

Related U.S. Application Data

(63) Continuation of application No. PCT/JP2021/030308, filed on Aug. 19, 2021.

(30) Foreign Application Priority Data

Nov. 10, 2020    (JP) .................................. 2020-186994

(51) Int. Cl.
*F04B 17/00*    (2006.01)
*C25B 1/02*    (2006.01)
(Continued)

(52) U.S. Cl.
CPC ................ *F04B 17/00* (2013.01); *C25B 1/02* (2013.01); *C25B 9/60* (2021.01); *C25B 9/75* (2021.01)

(58) Field of Classification Search
CPC ... F04B 17/00; C25B 9/60; C25B 9/75; C25B 9/77; C25B 1/02; Y02E 60/36; Y02E 60/32; Y02E 60/50; H01M 8/04; H01M 8/0662
See application file for complete search history.

(56) References Cited

U.S. PATENT DOCUMENTS 12,249,746 B2 *    3/2025   Hartwell ............... H01M 8/248
2006/0046121 A1 *   3/2006   Shimohira .......... H01M 8/0289
                                                          429/534
(Continued)

FOREIGN PATENT DOCUMENTS

JP       2019-218624      12/2019
KR    10-2020-086530 A     7/2020
WO       2020/095836 A1    5/2020

OTHER PUBLICATIONS

International Search Report of PCT application No. PCT/JP2021/030308 dated Nov. 2, 2021.
(Continued)

*Primary Examiner* — Dominick L Plakkoottam
(74) *Attorney, Agent, or Firm* — Rimon P.C.

(57) ABSTRACT

A compression apparatus includes at least one compression unit, a voltage applier, an anode end plate provided on an anode separator located at a first end in a direction of stacking, a cathode end plate provided on a cathode separator located at a second end in the direction of stacking, a first seal material that surrounds an outer periphery of the cathode, and a second seal material that surrounds an outer periphery of a first space in which to store compressed hydrogen, the first space being provided between the cathode end plate and the cathode separator located at the second end. The compression apparatus causes, by using the voltage applier to apply a voltage, protons taken out from an anode fluid that is supplied to the anode to move to the cathode via the electrolyte membrane and produces compressed hydrogen. An area of a region surrounded by the second seal material is larger than an area of a region surrounded by the first seal material.

18 Claims, 13 Drawing Sheets

(51) Int. Cl.
*C25B 9/60* (2021.01)
*C25B 9/75* (2021.01)

(56) References Cited

U.S. PATENT DOCUMENTS

| | | | | |
|---|---|---|---|---|
| 2006/0073373 | A1* | 4/2006 | Andrin | H01M 8/0271 |
| | | | | 429/510 |
| 2010/0248087 | A1* | 9/2010 | Tsuji | H01M 8/1004 |
| | | | | 429/535 |
| 2011/0089029 | A1* | 4/2011 | Volk, Jr. | C25B 11/00 |
| | | | | 204/276 |
| 2011/0147202 | A1* | 6/2011 | Haryu | C25B 9/73 |
| | | | | 204/257 |
| 2019/0218671 | A1* | 7/2019 | Yamamoto | C25B 9/05 |
| 2019/0383283 | A1* | 12/2019 | Ukai | C25B 1/02 |
| 2020/0011313 | A1 | 1/2020 | Ukai et al. | |
| 2021/0376339 | A1 | 12/2021 | Kawabata et al. | |

OTHER PUBLICATIONS

Nobuyuki Kawasaki et al., "Study of Seal Structure of High-differential-pressure Water Electrolysis Cell", Honda R&D Technical Review, vol. 25, No. 2 (Oct. 2013), Sep. 1, 2013, pp. 131-137.
The EPC Office Action dated Apr. 15, 2025 for the related European Patent Application No. 21891441.4.

* cited by examiner

COMPRESSION APPARATUS

BACKGROUND

1. Technical Field

The present disclosure relates to a compression apparatus.

2. Description of the Related Art

In recent years, due to environmental problems such as global warming and energy problems such as depletion of oil resources, hydrogen has drawn attention as a clean alternative energy source that replaces fossil fuels. Hydrogen is expected to serve as clean energy, as it basically produces only water even at the time of combustion, does not emit carbon dioxide, which is responsible for global warming, and hardly emits nitrogen oxides or other substances. Further, as devices that utilize hydrogen as a fuel with high efficiency, fuel cells are being developed and becoming widespread for use in automotive power supplies and in-house power generation.

For example, for use as a fuel in a fuel-cell vehicle, hydrogen is in general compressed into a high-pressure state of several tens of megapascals and stored in an in-vehicle hydrogen tank. Moreover, such high-pressure hydrogen is obtained, in general, by compressing low-pressure (normal pressure) hydrogen with a mechanical compression apparatus.

Incidentally, in a hydrogen-based society to come, there is demand for technological development that makes it possible to, in addition to producing hydrogen, store hydrogen at high densities and transport or utilize hydrogen in small amounts and at low cost. In particular, hydrogen-supply infrastructures need to be built to expedite the widespread use of fuel cells, and for stable supply of hydrogen, various suggestions are made for the production, purification, and high-density storage of high-purity hydrogen.

Under such circumstances, for example, "Study of Seal Structure of High-differential-pressure Water Electrolysis Cell", Honda Motor Co., Ltd., Honda R&D Technical Review Vol. 25 No. 2 (October 2013) proposes a high-differential-pressure water electrolysis apparatus (hereinafter referred to as "water electrolysis apparatus") in which water is separated into its hydrogen and oxygen components through electrolysis and high-pressure hydrogen is generated from low-pressure hydrogen via an electrolyte membrane.

In order to generate hydrogen and oxygen through the electrolysis of water, the water electrolysis apparatus has disposed therein a solid polymer electrolyte membrane, an anode catalyst layer and a cathode catalyst layer that are provided on both surfaces of the solid polymer electrolyte membrane, and an anode feeder and a cathode feeder that are provided on both sides of these catalyst layers. It should be noted that a stack of a cathode including a cathode catalyst layer and a cathode feeder, an electrolyte membrane, and an anode including an anode catalyst layer and an anode feeder is referred to as "membrane-electrode assembly" (hereinafter abbreviated as "MEA").

Moreover, a water electrolysis cell of "Study of Seal Structure of High-differential-pressure Water Electrolysis Cell", Honda Motor Co., Ltd., Honda R&D Technical Review Vol. 25 No. 2 (October 2013) is constituted by an MEA, an anode separator and a resin frame that include a normal-pressure flow channel through which to supply water, emit redundant water, and pass oxygen, and a cathode separator including a high-pressure gas flow channel through which to emit high-pressure hydrogen.

Further, in the water electrolysis apparatus, a plurality of the water electrolysis cells are stacked according to the amount of high-pressure hydrogen that is generated at a cathode, and terminals through which to apply a voltage are provided at both ends of the stack in a direction of stacking, whereby an electric current can be passed through the water electrolysis cell and water is supplied to the anode feeder. Then, on an anode side of the MEA, the water is electrolyzed, whereby protons are generated. The protons migrate toward the cathode by passing through the electrolyte membrane and recombine with electrons at the cathode feeder, whereby high-pressure hydrogen is generated. Then, the hydrogen is emitted from the water electrolysis apparatus via the high-pressure gas flow channel provided in the cathode separator. Meanwhile, oxygen generated at the anode and redundant water are emitted from the water electrolysis apparatus via the normal-pressure flow channel provided in the anode separator and in the resin frame.

Note here that the water electrolysis apparatus, which compresses hydrogen obtained through water electrolysis, is high in hydrogen gas pressure at the cathode feeder. This causes the separators or other members to deform, whereby there is a possibility of an increase in contact resistance between members constituting the water electrolysis cell.

To address this problem, "Study of Seal Structure of High-differential-pressure Water Electrolysis Cell", Honda Motor Co., Ltd., Honda R&D Technical Review Vol. 25 No. 2 (October 2013) proposes a structure in the water electrolysis apparatus in which a fastening member (bolt) is used to cause a stack including a plurality of the water electrolysis cells to be brought into close contact by end plates (both end plates). Further, an enclosed space is present between the upper end plate and a separator corresponding to an upper end of the stack, and this enclosed space has high-pressure hydrogen introduced thereinto. Furthermore, this enclosed space has an elastic body (spring) provided therein.

The foregoing configuration makes it possible to, even if the separators or other members are subjected by a high-pressure gas in the water electrolysis cell to stress that causes these members to deform in such a manner as to bulge outward, inhibit the aforementioned deformation with the reactive force of the elastic body and the high-pressure hydrogen gas pressure of the enclosed space.

Japanese Unexamined Patent Application Publication No. 2019-218624 proposes an electrochemical hydrogen pump in which a low-pressure hydrogen-containing gas is supplied to an anode, and only protons electrochemically pass through an electrolyte membrane, whereby high-pressure hydrogen is purified at a cathode. It should be noted that a description of the configuration of an electrochemical cell of the electrochemical hydrogen pump is omitted, as it is the same as the configuration of the water electrolysis cell of "Study of Seal Structure of High-differential-pressure Water Electrolysis Cell", Honda Motor Co., Ltd., Honda R&D Technical Review Vol. 25 No. 2 (October 2013) except that an anode fluid is a hydrogen-containing gas.

In Japanese Unexamined Patent Application Publication No. 2019-218624 too, as noted above, if the hydrogen gas pressure at the cathode feeder becomes high and the separators or other members deform as a result, there is a possibility of an increase in contact resistance between members constituting the electrochemical cell. To address this problem, Japanese Unexamined Patent Application Publication No. 2019-218624 inhibits the aforementioned deformation by introducing high-pressure generated at the cathode into spaces between upper and lower end plates (both end plates) and adjacent separators.

SUMMARY

One non-limiting and exemplary embodiment provides a compression apparatus that makes it possible to more appropriately reduce contact resistance between members constituting a compression unit than has conventionally been the case.

In one general aspect, the techniques disclosed here feature a compression apparatus including at least one compression unit including an electrolyte membrane, an anode provided on a first principal surface of the electrolyte membrane, a cathode provided on a second principal surface of the electrolyte membrane, an anode separator provided on the anode, and a cathode separator provided on the cathode, a voltage applier that applies a voltage between the anode and the cathode, an anode end plate provided on the anode separator located at a first end in a direction of stacking, a cathode end plate provided on the cathode separator located at a second end in the direction of stacking, a first seal material that surrounds an outer periphery of the cathode, and a second seal material that surrounds an outer periphery of a first space in which to store compressed hydrogen, the first space being provided between the cathode end plate and the cathode separator located at the second end. The compression apparatus causes, by using the voltage applier to apply a voltage, protons taken out from an anode fluid that is supplied to the anode to move to the cathode via the electrolyte membrane and produces compressed hydrogen. An area of a region surrounded by the second seal material is larger than an area of a region surrounded by the first seal material.

The compression apparatus according to the aspect of the present disclosure can bring about an effect of making it possible to more appropriately reduce contact resistance between members constituting a compression unit than has conventionally been the case.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
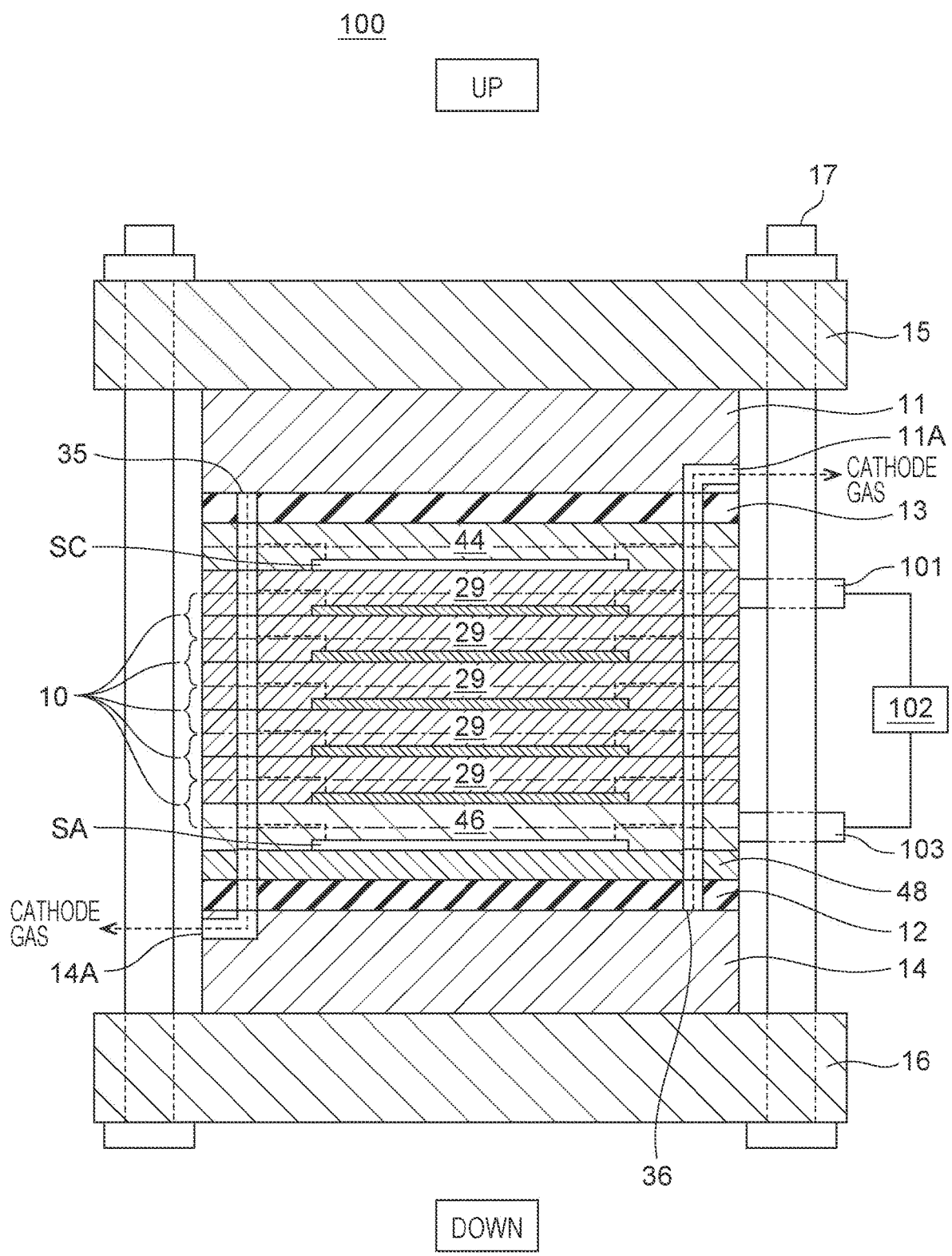
FIG. 1 is a diagram showing an example of an electrochemical hydrogen pump according to a first embodiment.

In "Study of Seal Structure of High-differential-pressure Water Electrolysis Cell", Honda Motor Co., Ltd., Honda R&D Technical Review Vol. 25 No. 2 (October 2013), a large recess having the shape of a circular cylinder is formed in a central part of a bottom surface of the upper end plate, the upper separator is completely inserted in the recess, whereby an enclosed space into which to introduce a high-pressure gas is formed by the end plate and the separator. However, due consideration is not given to the placement of a seal material for sealing the enclosed space.

Further, Japanese Unexamined Patent Application Publication No. 2019-218624, which proposes introducing high-pressure hydrogen into spaces between both upper and lower end plates and adjacent separators, fails to give due consideration to the placement of seal materials for sealing the spaces.

To address this problem, a compression apparatus according to a first aspect of the present disclosure is a compression apparatus including: at least one compression unit including an electrolyte membrane, an anode provided on a first principal surface of the electrolyte membrane, a cathode provided on a second principal surface of the electrolyte membrane, an anode separator provided on the anode, and a cathode separator provided on the cathode; a voltage applier that applies a voltage between the anode and the cathode; an anode end plate provided on the anode separator located at a first end in a direction of stacking; a cathode end plate provided on the cathode separator located at a second end in the direction of stacking; a first seal material that surrounds an outer periphery of the cathode; and a second seal material that surrounds an outer periphery of a first space in which to store compressed hydrogen, the first space being provided between the cathode end plate and the cathode separator located at the second end, wherein the compression apparatus causes, by using the voltage applier to apply a voltage, protons taken out from an anode fluid that is supplied to the anode to move to the cathode via the electrolyte membrane and produces compressed hydrogen, and an area of a region surrounded by the second seal material is larger than an area of a region surrounded by the first seal material.

Thus, the compression apparatus according to the present aspect makes it possible to more appropriately reduce contact resistance between members constituting the compression unit than has conventionally been the case.

Specifically, the gas pressure of the compressed hydrogen in the region surrounded by the second seal material is a high pressure about equal to the gas pressure of the compressed hydrogen in the region surrounded by the first seal material in the compression unit. Further, a load that is applied to the cathode separator by the gas pressure of the compressed gas in the region surrounded by the second seal material acts in such a manner as to inhibit the cathode separator from bending toward the cathode end plate due to the gas pressure of the compressed hydrogen in the region surrounded by the first seal material. This allows the compression apparatus according to the present aspect to make it hard for a gap to be formed between members constituting the compression unit.

Note here that if the area of the region surrounded by the second seal material is smaller than the area of the region surrounded by the first seal material, part of the region surrounded by the first seal material, when seen in plan view, does not fall within the region surrounded by the second seal material. This may cause part of the cathode separator that faces the aforementioned part of the region to bend toward the cathode end plate.

On the other hand, by being configured such that the area of the region surrounded by the second seal material is larger than the area of the region surrounded by the first seal material, the compression apparatus according to the present aspect allows the latter region to be completely accommodated by the former region in plan view. This allows the compression apparatus according to the present aspect to apply, to the whole area of the cathode separator that faces the region surrounded by the first seal material, a load that inhibits the aforementioned bending deformation, thus making it possible to more appropriately reduce contact resistance between members constituting the compression unit than has conventionally been the case.

A compression apparatus according to a second aspect of the present disclosure may be directed to the compression apparatus according to the first aspect, further including a third seal material that surrounds an outer periphery of a second space in which to store the compressed hydrogen, the second space being provided between the anode end plate and the anode separator located at the first end, wherein an area of a region surrounded by the third seal material is larger than the area of the region surrounded by the first seal material.

The gas pressure of the compressed hydrogen in the region surrounded by the third seal material is a high pressure about equal to the gas pressure of the compressed hydrogen in the region surrounded by the first seal material in the compression unit. Further, a load that is applied to the anode separator by the gas pressure of the compressed hydrogen in the region surrounded by the third seal material acts in such a manner as to inhibit the anode separator from bending toward the anode end plate due to the gas pressure of the compressed hydrogen in the region surrounded by the first seal material. This allows the compression apparatus according to the present aspect to make it hard for a gap to be formed between members constituting the compression unit.

Note here that if the area of the region surrounded by the third seal material is smaller than the area of the region surrounded by the first seal material, part of the region surrounded by the first seal material, when seen in plan view, does not fall within the region surrounded by the third seal material. This may cause part of the anode separator that faces the aforementioned part of the region to bend toward the anode end plate.

On the other hand, by being configured such that the area of the region surrounded by the third seal material is larger than the area of the region surrounded by the first seal material, the compression apparatus according to the present aspect allows the latter region to be completely accommodated by the former region in plan view. This allows the compression apparatus according to the present aspect to apply, to the whole area of the anode separator that faces the region surrounded by the first seal material, a load that inhibits the aforementioned bending deformation, thus making it possible to more appropriately reduce contact resistance between members constituting the compression unit than has conventionally been the case.

A compression apparatus according to a third aspect of the present disclosure may be directed to the compression apparatus according to the first or second aspect, wherein an area of a region surrounded by an outer edge of the second seal material is larger than an area of a region surrounded by an outer edge of the first seal material.

Note here that if the area of the region surrounded by the outer edge of the second seal material is smaller than the area of the region surrounded by the outer edge of the first seal material, part of the region surrounded by the outer edge of the first seal material, when seen in plan view, does not fall within the region surrounded by the outer edge of the second seal material.

This may cause a portion of the cathode separator that faces the part of the foregoing region to bend toward the cathode end plate. On the other hand, by being configured such that the area of the region surrounded by the outer edge of the second seal material is larger than the area of the region surrounded by the outer edge of the first seal material, the compression apparatus according to the present aspect can alleviate such inconvenience.

A compression apparatus according to a fourth aspect of the present disclosure may be directed to the compression apparatus according to the second aspect, wherein an area of a region surrounded by an outer edge of the third seal material is larger than an area of a region surrounded by an outer edge of the first seal material.

Note here that if the area of the region surrounded by the outer edge of the third seal material is smaller than the area of the region surrounded by the outer edge of the first seal material, part of the region surrounded by the outer edge of the first seal material, when seen in plan view, does not fall within the region surrounded by the outer edge of the third seal material.

This may cause a portion of the anode separator that faces the part of the foregoing region to bend toward the anode end plate. On the other hand, by being configured such that the area of the region surrounded by the outer edge of the third seal material is larger than the area of the region surrounded by the outer edge of the first seal material, the compression apparatus according to the present aspect can alleviate such inconvenience.

A compression apparatus according to a fifth aspect of the present disclosure may be directed to the compression apparatus according to any one of the first to fourth aspects, further including a ring material that is adjacent to an outer edge of the second seal material and that surrounds the second seal material.

When the first space is sealed with the second seal material, the gas pressure of the compressed hydrogen in the region surrounded by the second seal material may cause a gap to be formed between the members that are in contact with the second seal material. In this case, when no ring material surrounding the second seal material is provided, the gas pressure of compressed hydrogen present in the second seal material may cause part of the second seal material to protrude into the aforementioned gap. This may cause damage to the second seal material, thereby impairing the gas sealability of the second seal material.

On the other hand, by being configured such that a ring material surrounding the second seal material is provided adjacent to the outer edge of the second seal material, the compression apparatus according to the present aspect inhibits the second seal material from protruding into the aforementioned gap, thus causing less damage to the second seal material.

A compression apparatus according to a sixth aspect of the present disclosure may be directed to the compression apparatus according to the second or fourth aspect, further including a ring material that is adjacent to an outer edge of the third seal material and that surrounds the third seal material.

When the second space is sealed with the third seal material, the gas pressure of the compressed hydrogen in the region surrounded by the third seal material may cause a gap to be formed between the members that are in contact with the third seal material. In this case, when no ring material surrounding the third seal material is provided, the gas pressure of compressed hydrogen present in the third seal material may cause part of the third seal material to protrude into the aforementioned gap. This may cause damage to the third seal material, thereby impairing the gas sealability of the third seal material.

On the other hand, by being configured such that a ring material surrounding the third seal material is provided adjacent to the outer edge of the third seal material, the compression apparatus according to the present aspect inhibits the third seal material from protruding into the aforementioned gap, thus causing less damage to the third seal material.

A compression apparatus according to a seventh aspect of the present disclosure may be directed to the compression apparatus according to the fifth or sixth aspect, wherein no ring material surrounding the first seal material is provided on an outer edge of the first seal material.

When the cathode is sealed with the first seal material, the members that are in contact with the first seal material less bend toward the end plate than those which are in contact with the second and third seal materials, with the result that it is hard for a gap to be formed between the members that are in contact with the first seal material. For this reason, even in a case where no ring material surrounding the first seal material is provided, there is only a low possibility of the first seal material being damaged by the gas pressure of the compressed hydrogen present in the first seal material. Accordingly, by being configured such that no ring material surrounding the first seal material is provided on the outer edge of the first seal material, the compression apparatus according to the present aspect makes it possible to reduce the number of ring material components.

A compression apparatus according to an eighth aspect of the present disclosure may be directed to the compression apparatus according to any one of the first to seventh aspects, wherein a length from an inner edge to an outer edge of the second seal material is greater than a length from an inner edge to an outer edge of the first seal material.

The gas pressure of the compressed hydrogen in the region surrounded by the second seal material may cause the members that are in contact with the second seal material to bend toward the cathode end plate to cause a gap to be formed between the members; on the other hand, the members that are in contact with the first seal material less bend toward the cathode end plate than those which are in contact with the second seal material, with the result that it is hard for a gap to be formed between the members that are in contact with the first seal material.

To address this problem, the compression apparatus according to the present aspect is configured such that the length from the inner edge to the outer edge of the second seal material is greater than the length from the inner edge to the outer edge of the first seal material. This allows the second seal material to be higher in durability than in a case where the length of the second seal material is smaller than the length of the first seal material. Specifically, this causes less damage to the second seal material, as a greater length of the second seal material from the inner edge to the outer edge makes it harder for the second seal material to protrude into the aforementioned gap.

A compression apparatus according to a ninth aspect of the present disclosure may be directed to the compression apparatus according to any one of the second, fourth, and sixth aspects, wherein a length from an inner edge to an outer edge of the third seal material is greater than a length from an inner edge to an outer edge of the first seal material.

The gas pressure of the compressed hydrogen in the region surrounded by the third seal material may cause the members that are in contact with the third seal material to bend toward the anode end plate to cause a gap to be formed between the members; on the other hand, the members that are in contact with the first seal material less bend toward the anode end plate than those which are in contact with the third seal material, with the result that it is hard for a gap to be formed between the members that are in contact with the first seal material.

To address this problem, the compression apparatus according to the present aspect is configured such that the length from the inner edge to the outer edge of the third seal material is greater than the length from the inner edge to the outer edge of the first seal material. This allows the third seal material to be higher in durability than in a case where the length of the third seal material is smaller than the length of the first seal material. Specifically, this causes less damage to the third seal material, as a greater length of the third seal material from the inner edge to the outer edge makes it harder for the third seal material to protrude into the aforementioned gap.

A compression apparatus according to a tenth aspect of the present disclosure may be directed to the compression apparatus according to any one of the first to ninth aspects, wherein an outer edge of the first seal material falls within an outer edge of the second seal material when seen from an angle parallel with a direction of stacking of the anode separator, the anode, the electrolyte membrane, the cathode, and the cathode separator.

According to such a configuration, by being configured such that the outer edge of the first seal material falls within the outer edge of the second seal material in a plan view as seen from an angle parallel with the direction of stacking, the compression apparatus according to the present aspect can apply, to the whole area of the cathode separator that faces the region surrounded by the outer edge of the first seal material, a load that inhibits the aforementioned bending deformation.

A compression apparatus according to an eleventh aspect of the present disclosure may be directed to the compression apparatus according to any one of the second, fourth, sixth, and ninth aspects, wherein an outer edge of the first seal material falls within an outer edge of the third seal material when seen from an angle parallel with a direction of stacking of the anode separator, the anode, the electrolyte membrane, the cathode, and the cathode separator.

According to such a configuration, by being configured such that the outer edge of the first seal material falls within the outer edge of the third seal material in a plan view as seen from an angle parallel with the direction of stacking, the compression apparatus according to the present aspect can apply, to the whole area of the anode separator that faces the region surrounded by the outer edge of the first seal material, a load that inhibits the aforementioned bending deformation.

A compression apparatus according to a twelfth aspect of the present disclosure may be directed to the compression apparatus according to any one of the first to eleventh aspects, wherein an outer edge of the second seal material falls within an outer edge of the cathode separator when seen from an angle parallel with a direction of stacking of the anode separator, the anode, the electrolyte membrane, the cathode, and the cathode separator.

A compression apparatus according to a thirteenth aspect of the present disclosure may be directed to the compression apparatus according to any one of the second, fourth, sixth, ninth, and eleventh aspects, wherein an outer edge of the third seal material falls within an outer edge of the cathode separator when seen from an angle parallel with a direction of stacking of the anode separator, the anode, the electrolyte membrane, the cathode, and the cathode separator.

A compression apparatus according to a fourteenth aspect of the present disclosure may be directed to the compression apparatus according to any one of the first to thirteenth aspects, wherein the first seal material and the second seal material are O-rings.

A compression apparatus according to a fifteenth aspect of the present disclosure may be directed to the compression apparatus according to any one of the second, fourth, sixth, ninth, eleventh, and thirteenth aspects, wherein the first seal material, the second seal material, and the third seal material are O-rings.

The following describes embodiments of the present disclosure with reference to the accompanying drawings. It should be noted that the embodiments to be described below illustrate examples of the aforementioned aspects. Therefore, the shapes, materials, constituent elements, placement and topology of constituent elements, or other features that are shown below are just a few examples and, unless recited in the claims, are not intended to limit the aforementioned aspects. Further, those of the following constituent elements which are not recited in an independent claim representing the most generic concept of the aforementioned aspects are described as optional constituent elements. Further, a description of those constituent elements given the same reference signs in the drawings may be omitted. The drawings schematically show constituent elements for ease of comprehension and may not be accurate representations of shapes, dimensional ratios, or other features.

First Embodiment

The aforementioned anode fluid of the compression apparatus may be any of various types of gas or liquid. For example, in a case where the compression apparatus is an electrochemical hydrogen pump, the anode fluid may be a hydrogen-containing gas. Alternatively, for example, in a case where the compression apparatus is a water electrolysis apparatus, the anode fluid may be liquid water.

Accordingly, the following embodiment describes the configuration and operation of an electrochemical hydrogen pump including a hydrogen pump unit as an example of the aforementioned compression apparatus including a compression unit in a case where the anode fluid is a hydrogen-containing gas.

Apparatus Configuration

FIG. 1 is a diagram showing an example of an electrochemical hydrogen pump according to a first embodiment. For convenience of explanation, FIG. 1 takes "UP" and "DOWN" as shown therein (the same applies to the other drawings).

As shown in FIG. 1, the electrochemical hydrogen pump 100 includes at least one hydrogen pump unit 10, a first pressure forming member 44, a second pressure forming member 46, and a voltage applier 102. Moreover, the electrochemical hydrogen pump 100 includes a plurality of the hydrogen pump units 10 stacked on top of each other. For example, in FIG. 1, five hydrogen pump units 10 are stacked on top of each other. However, the number of hydrogen pump units 10 is not limited to this number. That is, the number of hydrogen pump units 10 can be set at an appropriate number on the basis of operating conditions such as the amount of hydrogen that the electrochemical hydrogen pump 100 compresses.

Further, in the example shown in FIG. 1, a plate that functions as an anode separator and a plate that functions as a cathode separator are integrated with each other. Specifically, each bipolar plate 29 includes a plate that functions as a cathode separator of one of adjacent hydrogen pump units 10 and a plate that functions as an anode separator of the other of the adjacent hydrogen pump units 10.

Note, however, that as shown in FIG. 1, the uppermost bipolar plate 29 is configured to function solely as a cathode separator. Specifically, the uppermost bipolar plate 29 has its upper surface in contact with a space SC of the first pressure forming member 44, and this upper surface is not provided with an anode gas flow channel through which the hydrogen-containing gas flows. The first pressure forming member 44 has formed therein the space SC in which to store a compressed-hydrogen-containing cathode gas generated at cathodes of the hydrogen mump units 10. That is, the upper surface of the uppermost bipolar plate 29 functions as a lid for sealing the space SC of the first pressure forming member 44.

Further, the lowermost hydrogen pump unit 10 is constituted by a plate that functions as a cathode separator of the lowermost bipolar plate 29 and a plate that functions as an anode separator of the second pressure forming member 46. Specifically, the second pressure forming member 46 has its upper surface provided with an anode gas flow channel (not illustrated in FIG. 1) through which the hydrogen-containing gas flows. The second pressure forming member 46 has formed therein a space SA in which to store the compressed-hydrogen-containing cathode gas generated at the cathodes of the hydrogen mump units 10.

The configuration of the bipolar plates 29, the hydrogen pump units 10, the first pressure forming member 44, and the second pressure forming member 46 will be described in detail later.

As shown in FIG. 1, the electrochemical hydrogen pump 100 includes a cathode end plate 15, an anode end plate 16, and a fastener 17. The cathode end plate 15 and the anode end plate 16 are provided on both ends, respectively, in a direction (hereinafter referred to as "direction of stacking") in which the hydrogen pump units 10 are stacked on top of each other. Specifically, the anode end plate 16 is provided on an anode separator located at a first end in the direction of stacking of the hydrogen pump units 10. The cathode end plate 15 is provided on a cathode separator located at a second end in the direction of stacking of the hydrogen pump units 10. The fastener 17 may be configured in any way as long as members constituting the stack of the electrochemical hydrogen pump 100 can be fastened in the direction of stacking. Possible examples of the fastener 17 include bolts and nuts with disc springs. The configuration of the fastener 17 will be described in detail in section "Second Example".

As shown in FIG. 1, the electrochemical hydrogen pump 100 has a fluid collecting and delivering member 11 and an insulating plate 13 stacked in this order from above between the cathode end plate 15 and the first pressure forming member 44. Alternatively, the first pressure forming member 44 and the insulating plate 13 may be stacked in inverse order. The electrochemical hydrogen pump 100 also has a fluid collecting and delivering member 14, an insulating plate 12, and a seal plate 48 stacked in this order from below between the anode end plate 16 and the second pressure forming member 46.

At appropriate points in a side surface of the fluid collecting and delivering member 14, there are provided an outlet (not illustrated) through which a low-pressure (e.g. approximately normal pressure to several megapascals) hydrogen-containing gas emitted from anodes of the hydrogen pump units 10 flows out, an outlet (not illustrated) through which a cooling medium (e.g. water) for controlling the hydrogen pump units 10 at an appropriate temperature flows out, and an outlet 14A through which a high-pressure (e.g. approximately several megapascals to several tens of megapascals) cathode gas emitted from the cathodes of the hydrogen pump units 10 passes. The outlet 14A communicates with a first cathode gas lead-out manifold 35 via a gas path provided in the fluid collecting and delivering member 14.

As shown in FIG. 1, the first cathode gas lead-out manifold 35 is constituted by a series of through-holes provided in members, namely the plurality of bipolar plates 29, the first pressure forming member 44, the insulating plate 13, the second pressure forming 46, the seal plate 48, and the insulating plate 12. Moreover, the electrochemical hydrogen pump 100 is configured such that portions of the cathode gas emitted from the respective cathodes of the hydrogen pump units 10 meet at the first cathode gas lead-out manifold 35 via communicating paths (see dotted lines in FIG. 1) provided in the bipolar plates 29. Further, the electrochemical hydrogen pump 100 is configured such that the first cathode gas lead-out manifold 35 and the space SC of the first pressure forming member 44 communicate with each other via a communicating path (see a dotted line in FIG. 1) provided in the first pressure forming member 44. Furthermore, the electrochemical hydrogen pump 100 is configured such that the first cathode gas lead-out manifold 35 and the space SA of the second pressure forming member 46 communicate with each other via a communicating path (see a dotted line in FIG. 1) provided in the second pressure forming member 46. Although not illustrated in FIG. 1, the hydrogen-containing gas outlet and the cooling medium outlet in the fluid collecting and delivering member 14 communicate with an anode gas lead-out manifold and a cooling medium lead-out manifold, respectively, that are constituted by series of through-holes provided in the aforementioned members.

At appropriate points in a side surface of the fluid collecting and delivering member 11, there are provided an inlet (not illustrated) through which a low-pressure (e.g. approximately normal pressure to several megapascals) hydrogen-containing gas to be supplied to the anodes of the hydrogen pump units 10 flows in, an inlet (not illustrated) through which a cooling medium (e.g. water) for controlling the hydrogen pump units 10 at an appropriate temperature flows in, and an inlet 11A through which a high-pressure (e.g. approximately several megapascals to several tens of megapascals) cathode gas emitted from the cathodes of the hydrogen pump units 10 passes. The outlet 11A communicates with a second cathode gas lead-out manifold 36 via a gas path provided in the fluid collecting and delivering member 11.

As shown in FIG. 1, the second cathode gas lead-out manifold 36 is constituted by a series of through-holes provided in members, namely the plurality of bipolar plates 29, the first pressure forming member 44, the insulating plate 13, the second pressure forming 46, the seal plate 48, and the insulating plate 12. Moreover, the electrochemical hydrogen pump 100 is configured such that portions of the cathode gas emitted from the respective cathodes of the hydrogen pump units 10 meet at the second cathode gas lead-out manifold 36 via communicating paths (see dotted lines in FIG. 1) provided in the bipolar plates 29. Further, the electrochemical hydrogen pump 100 is configured such that the second cathode gas lead-out manifold 36 and the space SC of the first pressure forming member 44 communicate with each other via a communicating path (see a dotted line in FIG. 1) provided in the first pressure forming member 44. Furthermore, the electrochemical hydrogen pump 100 is configured such that the second cathode gas lead-out manifold 36 and the space SA of the second pressure forming member 46 communicate with each other via a communicating path (see a dotted line in FIG. 1) provided in the second pressure forming member 46. Although not illustrated in FIG. 1, the hydrogen-containing gas inlet and the cooling medium inlet in the fluid collecting and delivering member 11 communicate with an anode gas lead-in manifold and a cooling medium lead-in manifold, respectively, that are constituted by series of through-holes provided in the aforementioned members.

It should be noted that the configuration of the communicating paths indicated by the dotted lines in FIG. 1 will be described in detail later.

The insulating plate 13 is inserted between the first pressure forming member 44 and the fluid collecting and delivering member 11, whereby the bipolar plates 29 are appropriately insulated from the fluid collecting and delivering member 11, the cathode end plate 15, and the fastener 17. Possible examples of a material of which the insulating plate 13 is made include, but are not limited to, materials such as rubber, resin (e.g. PEN and PET), glass, and a glass epoxy material.

The insulating plate 12 is inserted between the seal plate 48 and the fluid collecting and delivering member 14, whereby the bipolar plates 29 and the second pressure forming member 46 are appropriately insulated from the fluid connecting and delivering member 14, the anode end plate 16, and the fastener 17. Possible examples of a material of which the insulating plate 12 is made include, but are not limited to, materials such as rubber, resin (e.g. PEN and PET), glass, and a glass epoxy material.

The seal plate 48 functions as a lid for sealing the space SA of the second pressure forming member 46, whereby a high-pressure cathode gas stored in the space SA is sealed in. Possible examples of a material of which the seal plate 48 is made include, but are not limited to, materials such as stainless steel, gold, titanium, rubber, resin (e.g. PEN and PET), glass, and a glass epoxy material. Note, however, that in a case where stainless steel is used as a material of which the seal plate 48 is made, it is preferable that the stainless steel used be SUS316L, which is superior in properties such as acid resistance and hydrogen brittleness resistance. Further, in a case where that an insulating member such as resin is used as a material of which the seal plate 48 is made, the seal plate 48 and the insulating plate 12 may be integrated with each other.

The voltage applier 102 is a device that applies a voltage between the anodes and cathodes of the hydrogen pump units 10. Specifically, a high potential of the voltage applier 102 is applied to the anodes, and a low potential of the voltage applier 102 is applied to the cathodes. The voltage applier 102 may be configured in any way as long as it can apply a voltage between the anodes and the cathodes. For example, the voltage applier 102 may be a device that adjusts a voltage that is applied between the anodes and the cathodes. In this case, the voltage applier 102 includes a DC/DC converter when it is connected to a direct-current power source such as a battery, a solar cell, or a fuel cell, or includes an AC/DC converter when it is connected to an alternate-current power source such as a commercial power source.

Alternatively, the voltage applier 102 may be an electricity-powered power source by which a voltage that is applied between the anodes and the cathodes and an electric current that flows between the anodes and the cathodes are adjusted so that electric power of a predetermined set value is supplied to the hydrogen pump units 10.

Although, in the example shown in FIG. 1, the voltage applier 102 has its low-potential terminal 101 connected to the uppermost bipolar plate 29 and has its high-potential terminal 103 connected to the second pressure forming member 46, this is not intended to impose any limitation. The low-potential terminal 101 of the voltage applier 102 may be connected to the first pressure forming member 44.

However, as shown in FIG. 1, connecting the low-potential terminal 101 of the voltage applier 102 to the uppermost bipolar plate 29 makes it unnecessary to subject the first pressure forming member 44, which is placed above the uppermost bipolar plate 29, to surface treatment such as gold plating. This makes it possible to reduce the manufacturing cost of the first pressure forming member 44.

Furthermore, in the example shown in FIG. 1, the uppermost bipolar plate 29 and the second pressure forming member 46 are used also as current collectors. Therefore, the electrochemical hydrogen pump 100 according to the present embodiment makes it possible to reduce the manufacturing cost of the apparatus, as the number of plates can be reduced by using the plates for a double purpose.

Further, in the electrochemical hydrogen pump 100, the fluid collecting and delivering member 11, the first pressure forming member 44, the bipolar plates 29, the second pressure forming member 46, and the fluid collecting and delivering member 14 are constituted by SUS316L, as these members are exposed to high-pressure compressed hydrogen. This is because SUS316L is superior in properties such as acid resistance and hydrogen brittleness resistance among various types of stainless steel. On the other hand, the cathode end plate 15, the anode end plate 16, and the fastener 17 are constituted by chromium-molybdenum steel (e.g. SCM45), which is less expensive than SUS316L, as these members are not exposed to hydrogen.

Configuration of Bipolar Plates and Hydrogen Pump Units

Figure 2:
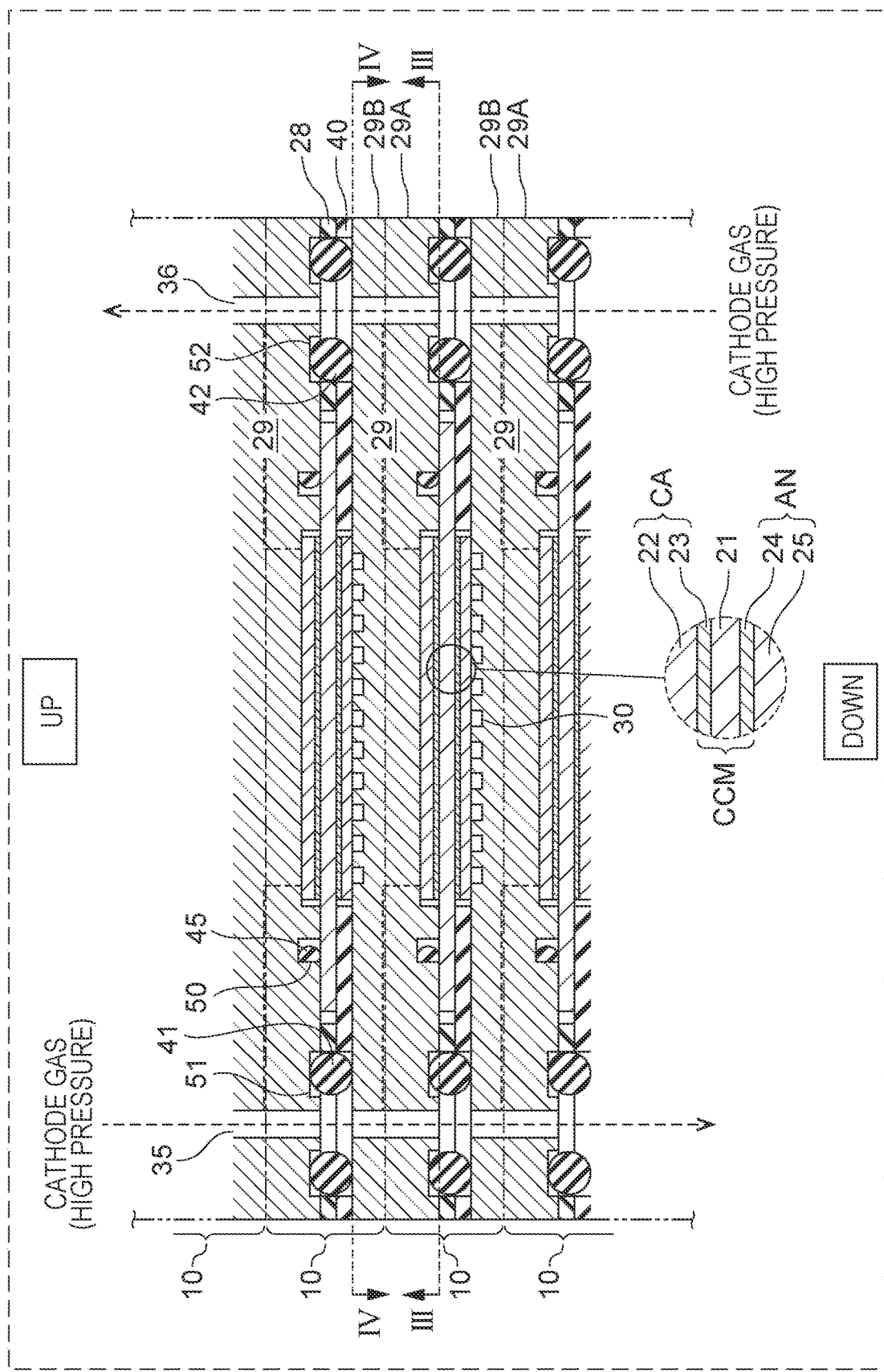
FIG. 2 is a diagram showing examples of bipolar plates and hydrogen pump units of FIG. 1.

FIG. 2 is a diagram showing examples of bipolar plates and hydrogen pump units of FIG. 1.

Figure 3:
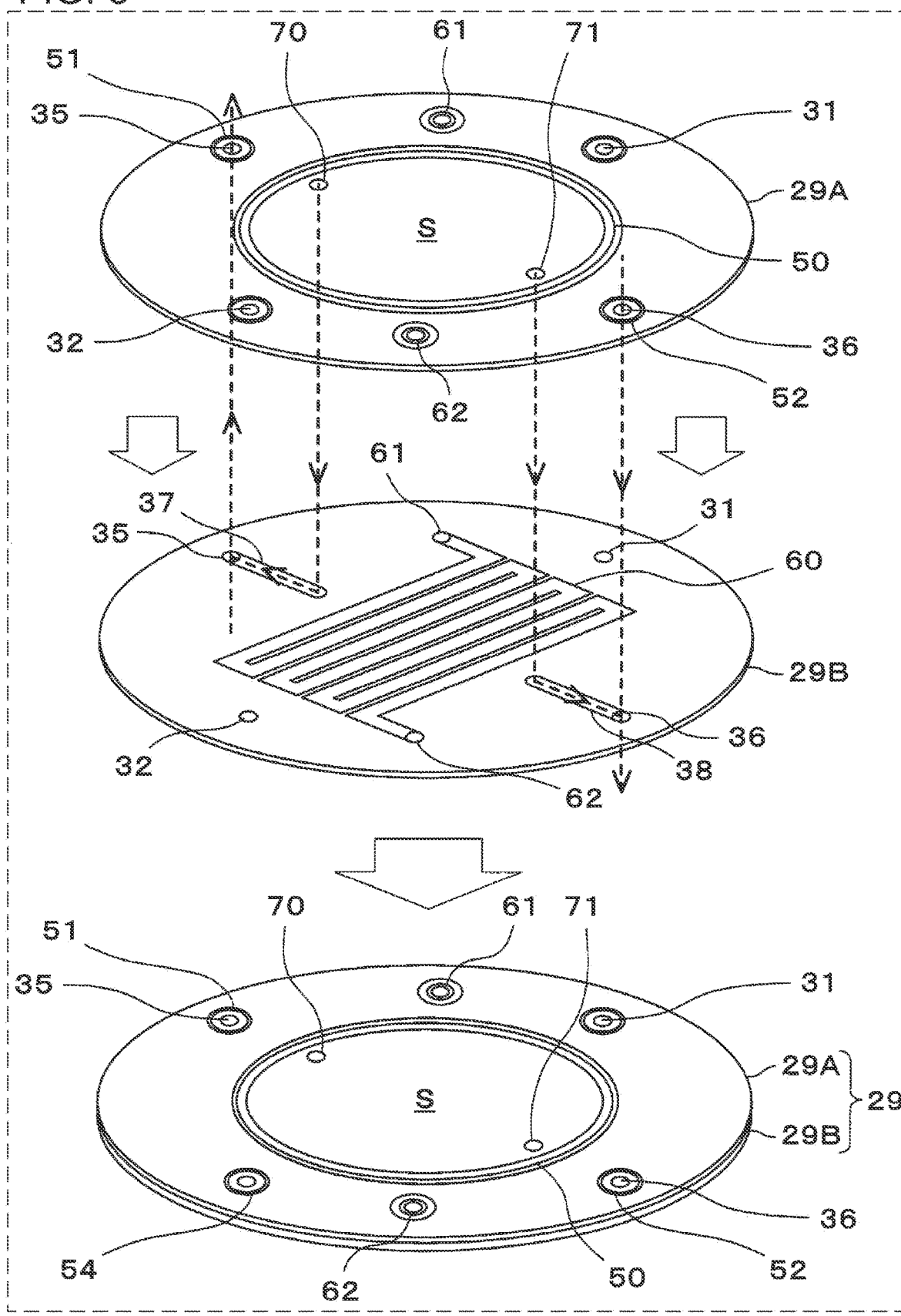
FIG. 3 is an exploded perspective view of a bipolar plate of FIG. 2.

FIG. 3 is an exploded perspective view of a bipolar plate of FIG. 2. Specifically, FIG. 3 illustrates a perspective view of a pair of members constituting a bipolar plate 29 as seen from section III-III of FIG. 2 and a diagram of the members integrated with each other. For convenience of explanation, FIG. 3 omits to illustrate an MEA and an O-ring.

Figure 4:
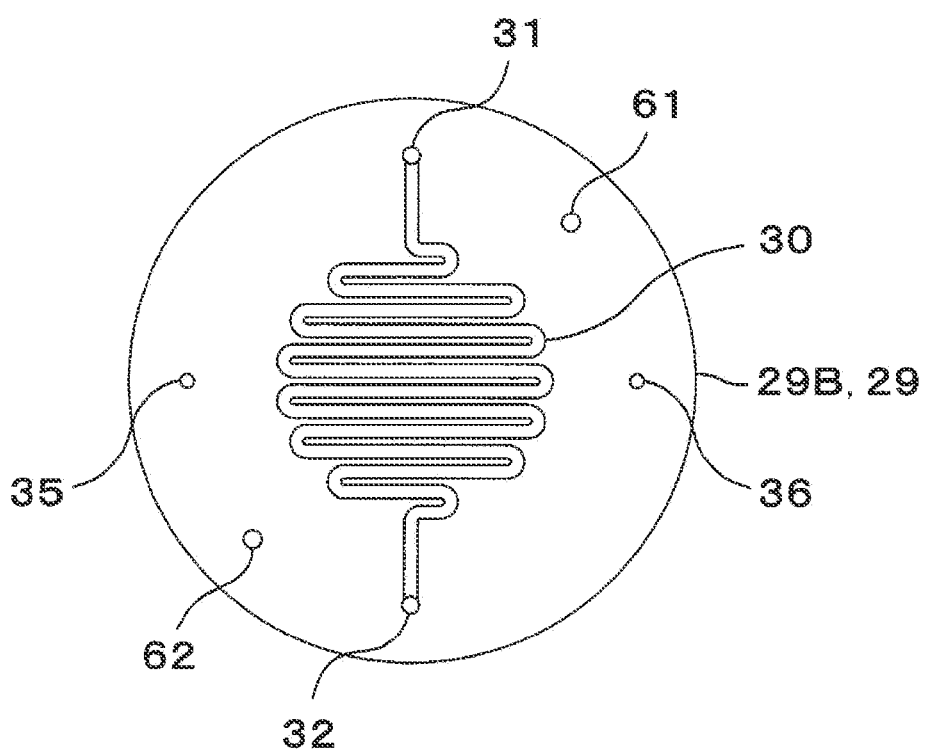
FIG. 4 is a top view of a bipolar plate of FIG. 2.

FIG. 4 is a top view of a bipolar plate of FIG. 2. Specifically, FIG. 4 is a plan view of a member constituting a bipolar plate 29 as seen from section IV-IV of FIG. 2.

As noted above, in each of the hydrogen pump units 10, the bipolar plate 29 includes a plate that functions as an anode separator of one of adjacent hydrogen pump units 10 and a plate that functions as a cathode separator of the other of the adjacent hydrogen pump units 10. In the example shown in FIG. 2, part of an upper bipolar plate 29 constitutes a cathode separator, and part of a lower bipolar plate 29 constitutes an anode separator.

In the following description, the plate that functions as a cathode separator is referred to as "cathode separator 29A", and the plate that functions as an anode separator is referred to as "anode separator 29B".

Note here that as shown in FIG. 3, the cathode separator 29A and anode separator 29B of each of the bipolar plates 29 are integrated with each other by surface joining. For example, the cathode separator 29A and the anode separator 29B can be joined by diffusion joining of a pair of metal plates. According to the Japanese Industrial Standards (JIS), the term "diffusion joining" is defined as a "method by which base metals are brought into close contact with each other, pressurized under temperature conditions equal to or lower than the melting points of the base metals to such an extent that as little plastic deformation as possible takes place, and joined by utilizing diffusion of atoms between joint surfaces".

Further, prior to surface joining of the cathode separator 29A and the anode separator 29B, the anode separator 29B has provided on a joint surface thereof a cooling flow channel 60 through which a cooling medium for adjusting the temperature of the hydrogen pump unit 10 to an appropriate temperature flows. The cooling flow channel 60 has both of its ends communicating with a cooling medium lead-in manifold 61 and a cooling medium lead-out manifold 62, respectively.

As shown in FIG. 2, the hydrogen pump unit 10 includes an electrolyte membrane 21, an anode AN, a cathode CA, a cathode separator 29A, an anode separator 29B, a frame body 28, and a surface seal material 40. Moreover, in the hydrogen pump unit 10, the electrolyte membrane 21, an anode catalyst layer 24, a cathode catalyst layer 23, an anode feeder 25, a cathode feeder 22, the cathode separator 29A, and the anode separator 29B are stacked.

The anode AN is provided on a first principal surface of the electrolyte membrane 21. The anode AN is an electrode including the anode catalyst layer 24 and the anode feeder 25.

The cathode CA is provided on a second principal surface of the electrolyte membrane 21. The cathode CA is an electrode including the cathode catalyst layer 23 and the cathode feeder 22.

In general, the electrochemical hydrogen pump 100 often involves the use of a catalyst-coated membrane CCM obtained by integrally joining the cathode catalyst layer 23 and the anode catalyst layer 24 to the electrolyte membrane 21.

Accordingly, in the electrochemical hydrogen pump 100 according to the present embodiment, the anode feeder 25 and the cathode feeder 22 are provided on the anode catalyst layer 24 and cathode catalyst layer 23, respectively, of the catalyst-coated membrane CCM.

Thus, the electrolyte membrane 21 is sandwiched between the anode AN and the cathode CA.

The electrolyte membrane 21 is a polymer membrane having a proton-conducting property. The electrolyte membrane 21 may be configured in any way as long as it has a proton-conducting property. Possible examples of the electrolyte membrane 21 include, but are not limited to, a fluorinated polymer electrolyte membrane and a hydrocarbon polymer electrolyte membrane. Specifically, usable examples of the electrolyte membrane 21 include Nafion (registered trademark, manufactured by DuPont) and Aciplex (registered trademark, manufactured by Asahi Kasei Corporation).

The anode catalyst layer 24 is provided in contact with the first principal surface of the electrolyte membrane 21. Examples of a catalyst metal that the anode catalyst layer 24 contains include, but are not limited to, platinum.

The cathode catalyst layer 23 is provided in contact with the second principal surface of the electrolyte membrane 21. Examples of a catalyst metal that the cathode catalyst layer 23 contains include, but are not limited to, platinum.

Examples of catalyst carriers of the cathode catalyst layer 23 and the anode catalyst layer 24 include, but are not limited to, carbon particles such as carbon black and black lead and electrically-conductive oxide particles.

In the cathode catalyst layer 23 and the anode catalyst layer 24, fine particles of catalyst metal are highly dispersedly carried by the catalyst carriers. Further, it is common to add a proton-conducting ionomer into the cathode catalyst layer 23 and the anode catalyst layer 24 in order to make a large electrode reaction site.

The cathode feeder 22 is provided on the cathode catalyst layer 23. Further, the cathode feeder 22 is constituted by a porous material, and has electrical conductivity and gas diffusibility. Furthermore, it is desirable that the cathode feeder 22 have such elasticity as to appropriately follow the displacement and deformation of a constituent member that occur due to a differential pressure between the cathode CA and the anode AN during operation of the electrochemical hydrogen pump 100. In the electrochemical hydrogen pump 100 according to the present embodiment, a member made from carbon fibers is used as the cathode feeder 22. For example, a porous carbon fiber sheet such as carbon paper, carbon cloth, or carbon felt may be used. As a base material from which the cathode feeder 22 is made, a carbon fiber sheet may not be used. For example, as a base material from which the cathode feeder 22 is made, a sintered body of metal fibers made of titanium, a titanium alloy, stainless steel, or other metals or a sintered body of metal particles made thereof may be used.

The anode feeder 25 is provided on the anode catalyst layer 24. Further, the anode feeder 25 is constituted by a porous material, and has electrical conductivity and gas diffusibility. Furthermore, it is desirable that the anode feeder 25 be so high in rigidity as to be able to inhibit the displacement and deformation of a constituent member that occur due to a differential pressure between the cathode CA and the anode AN during operation of the electrochemical hydrogen pump 100.

Specifically, usable examples of a base material from which the anode feeder 25 is made include a fiber sintered body, a powder sintered body, an expanded metal, a metal mesh, and a punching metal that are made of titanium, a titanium alloy, stainless steel, carbon, or other materials.

The anode separator 29B is a member stacked on the anode AN. The cathode separator 29A is a member stacked on the cathode CA.

The anode feeder 25 is in contact with a central part of an anode AN side surface of the anode separator 29B that faces the anode AN. Moreover, in the central part, as shown in FIG. 4, an anode gas flow channel 30 having a serpentine shape in plan view is provided. The anode gas flow channel 30 has both of its ends communicating with an anode gas lead-in manifold 31 and an anode gas lead-out manifold 32, respectively.

In a central part of a cathode CA side surface of the cathode separator 29A that faces the cathode CA, a recess is provided, and in this recess, the cathode feeder 22 is accommodated. That is, the recess is equivalent to a space S (see FIG. 3) in which to store the compressed-hydrogen-containing cathode gas generated at the cathode CA of the hydrogen pump unit 10.

Note here that as shown in FIG. 3, the anode separator 29B is provided with a first cathode gas lead-out manifold 35 through which the cathode gas flows, a second cathode gas lead-out manifold 36 through which the cathode gas flows, and communicating paths 37 and 38 through which to lead, to the first cathode gas lead-out manifold 35 and the second cathode gas lead-out manifold 36, portions of the cathode gas having flowed in from the recess (space S) of the cathode separator 29A, respectively.

Specifically, the communicating path 37 is constituted by a flow channel groove on the joint surface of the anode separator 29B prior to surface joining of the cathode separator 29A and the anode separator 29B. When seen in plan view, this flow channel groove linearly extends across O-ring grooves 50 and 51 provided in an anode AN side principal surface of the cathode separator 29A. Moreover, the flow channel groove has its first end communicating with the inside of the recess (space S) of the cathode separator 29A via a communicating hole 70 extending up and down near an edge of a bottom surface of the recess. The flow channel groove has its second end connected to the first cathode gas lead-out manifold 35. The communicating path 37 is appropriately sealed against the entrance of gasses by the cathode separator 29A and the anode separator 29B being integrated with each other by surface joining.

During hydrogen compression operation of the electrochemical hydrogen pump 100, the high-pressure cathode gas generated at the cathode CA is stored in the recess (space S) of the cathode separator 29A, and after that, the cathode gas flows from the space S into the communicating hole 70 and the communicating path 37 in this order as indicated by a dotted arrow in FIG. 3 and is supplied to the first cathode gas lead-out manifold 35.

The communicating path 38 is constituted by a flow channel groove on the joint surface of the anode separator 29B prior to surface joining of the cathode separator 29A and the anode separator 29B. When seen in plan view, this flow channel groove linearly extends across the O-ring groove 50 and an O-ring groove 52 provided in the cathode separator 29A. Moreover, the flow channel groove has its first end communicating with the inside of the recess (space S) of the cathode separator 29A via a communicating hole 71 extending up and down near the edge of the bottom surface of the recess. The flow channel groove has its second end connected to the second cathode gas lead-out manifold 36. The communicating path 38 is appropriately sealed against the entrance of gasses by the cathode separator 29A and the anode separator 29B being integrated with each other by surface joining.

During hydrogen compression operation of the electrochemical hydrogen pump 100, the high-pressure cathode gas generated at the cathode CA is stored in the recess (space S) of the cathode separator 29A, and after that, the cathode gas flows from the space S into the communicating hole 71 and the communicating path 38 in this order as indicated by a dotted arrow in FIG. 3 and is supplied to the second cathode gas lead-out manifold 36.

In this way, the electrochemical hydrogen pump 100 according to the present embodiment can appropriately supply the high-pressure cathode gas to the first and second cathode gas lead-out manifolds 35 and 36 of the anode separator 29B from the space S of the cathode separator 29A through the communicating paths 37 and 38 of the anode separator 29B, respectively.

Although, in the present example, the communicating paths 37 and 38 and the communicating holes 70 and 71 are provided on a straight line connecting the center of the first cathode gas lead-in manifold 35 with the center of the second cathode gas lead-in manifold 36 in plan view, this is not intended to impose any limitation. The communicating paths and the communicating holes may be placed in any places and formed in any shapes as long as they can lead, to the cathode gas lead-in manifolds, portions of the cathode gas having flowed in from the recess (space S) of the cathode separator 29A. Further, the numbers of communicating paths and communicating holes may be 1, or may be equal to or larger than 3.

Although the cathode separator 29A and the anode separator 29B may be constituted, for example, by metal sheets of titanium, stainless steel, gold, or other metals, this is not intended to impose any limitation. For example, a base material from which the cathode separator 29A and the anode separator 29B are made may be constituted by carbon, resin having a metal membrane formed on a surface thereof, or other substances. In a case where the cathode separator 29A and the anode separator 29B are constituted by stainless steel, it is desirable that SUS316L be used as a material of which the cathode separator 29A and the anode separator 29B are made. This is because SUS316L is superior in properties such as acid resistance and hydrogen brittleness resistance among various types of stainless steel.

By the MEA thus being sandwiched between the cathode separator 29A and the anode separator 29B, the hydrogen pump unit 10 is formed.

Note here that as shown in FIG. 2, there is provided an O-ring 45 surrounding the outer periphery of the cathode CA. Specifically, the cathode separator 29A has the O-ring groove 50, provided on a cathode CA side principal surface thereof, which, when seen in plan view, surrounds a region on the principal surface that faces the cathode CA, and the O-ring 45 is retained in the O-ring groove 50. This causes the high-pressure cathode gas present at the cathode CA to be sealed in by the O-ring 45 and appropriately prevented from leaking out of a region surrounded by the O-ring 45. It should be noted that the O-ring 45 corresponds to an example of the "first seal material" of the present disclosure.

Further, the O-ring groove 50 faces a region on a cathode CA side principal surface of the electrolyte membrane 21 in which the cathode CA is not provided. In the example shown in FIG. 2, the electrolyte membrane 21 is provided with a great width to extend across a side wall of the recess in which the cathode CA is accommodated, and the O-ring 45 is provided in contact with a wide portion of the electrolyte membrane 21. Usable examples of the O-ring 45 (the same applies to other O-rings) include, but are not limited to, an O-ring of fluorocarbon rubber from the point of view of acid resistance and hydrogen brittleness resistance.

The frame body 28 is a member provided around the outer periphery of the electrolyte membrane 21. Possible examples of a base material from which the frame body 28 is made include, but are not limited to, fluorocarbon rubber from the point of view of acid resistance and hydrogen brittleness resistance. The insulative frame body 28 makes it possible to appropriately configure the hydrogen pump unit 10 such that it is hard for the cathode separator 29A and the anode separator 29B to become short-circuited with each other.

The surface seal material 40 is provided on the outer periphery of a region on the anode AN side principal surface of the anode separator 29B that faces the anode AN. Further, the surface seal material 40 faces a region on an anode AN side principal surface of the electrolyte membrane 21 in which the anode AN is not provided and an anode AN side principal surface of the frame body 28. In the example shown in FIG. 2, the electrolyte membrane 21 is provided with a great width to extend across an outer peripheral end of the anode AN, and a wide portion of the electrolyte membrane 21 and the principal surface of the frame body 28 are in contact with a principal surface of the surface seal material 40. Possible examples of a base material from which the surface seal material 40 is made include, but are not limited to, fluorocarbon rubber and fluororesin from the point of view of acid resistance and hydrogen brittleness resistance. The insulative surface seal material 40 makes it possible to appropriately configure the hydrogen pump unit 10 such that it is hard for the cathode separator 29A and the anode separator 29B to become short-circuited with each other.

Although, in the electrochemical hydrogen pump 100 according to the present embodiment, the electrolyte membrane 21 and the frame body 28 are separately constructed, they may be integrated with each other. Further, such a frame 28 may not be provided. For example, even without the frame body 28, the surface seal material 40 makes it possible to configure the hydrogen pump unit 10 such that it is hard for the cathode separator 29A and the anode separator 29B to become short-circuited with each other.

As shown in FIG. 2, the cathode separator 29A is provided with the O-ring groove 51, which surrounds the first cathode gas lead-out manifold 35. Moreover, an O-ring 41 is retained in the O-ring groove 51. The cathode separator 29A is provided with the O-ring groove 52, which surrounds the second cathode gas lead-out manifold 36. Moreover, an O-ring 42 is retained in the O-ring groove 52.

Note here that in the electrochemical hydrogen pump 100 according to the present embodiment, the O-ring 41 and the O-ring 42 are each in contact with the anode AN side principal surface of the anode separator 29B. That is, the O-ring 41 and the O-ring 42 are each in contact with both a cathode separator 29A and a anode separator 29B corresponding to the bipolar plates 29 on both sides. Moreover, the surface seal material 40 is not provided on a region on the anode AN side principal surface of the anode separator 29B with which the O-ring 41 and the O-ring 42 are in contact. Further, the frame body 28 is not provided in a region in which the O-ring 41 and the O-ring 42 are disposed.

Specifically, the frame body 28 has a pair of through-holes (circular openings) formed therein so that the respective outer shapes of the through-holes are identical to the respective outer shapes of the O-ring grooves 51 and 52. Further, the surface seal material 40 has a pair of through-holes (circular openings) formed therein so that the respective outer shapes of the through-holes are identical to the respective outer shapes of the O-ring grooves 51 and 52. Moreover, a columnar space constituted by through-holes provided in the frame body 28 and the surface seal material 40 accommodates the O-ring 41, and an inner part of the O-ring 41 provided in the columnar shape constitutes part of the first cathode gas lead-out manifold 35. Further, a columnar space constituted by through-holes provided in the frame body 28 and the surface seal material 40 accommodates the O-ring 42, and an inner part of the O-ring 42 provided in the columnar shape constitutes part of the second cathode gas lead-out manifold 36.

Configuration of First Pressure Forming Member

Figure 5:
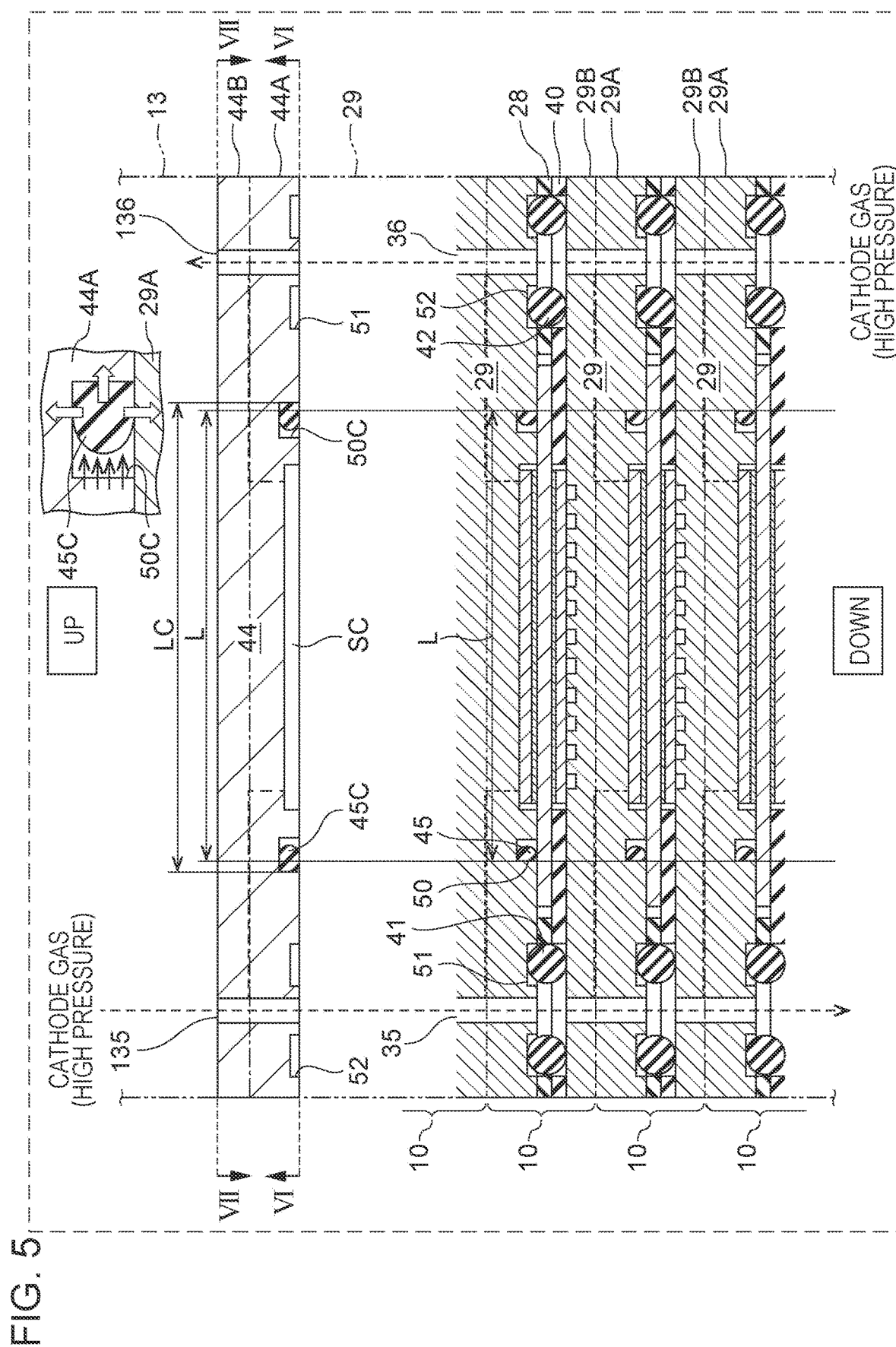
FIG. 5 is a diagram showing an example of a first pressure forming member of FIG. 1 together with the bipolar plates and the hydrogen pump units of FIG. 1.

FIG. 5 is a diagram showing an example of the first pressure forming member of FIG. 1 together with the bipolar plates and the hydrogen pump units of FIG. 1.

Figure 6:
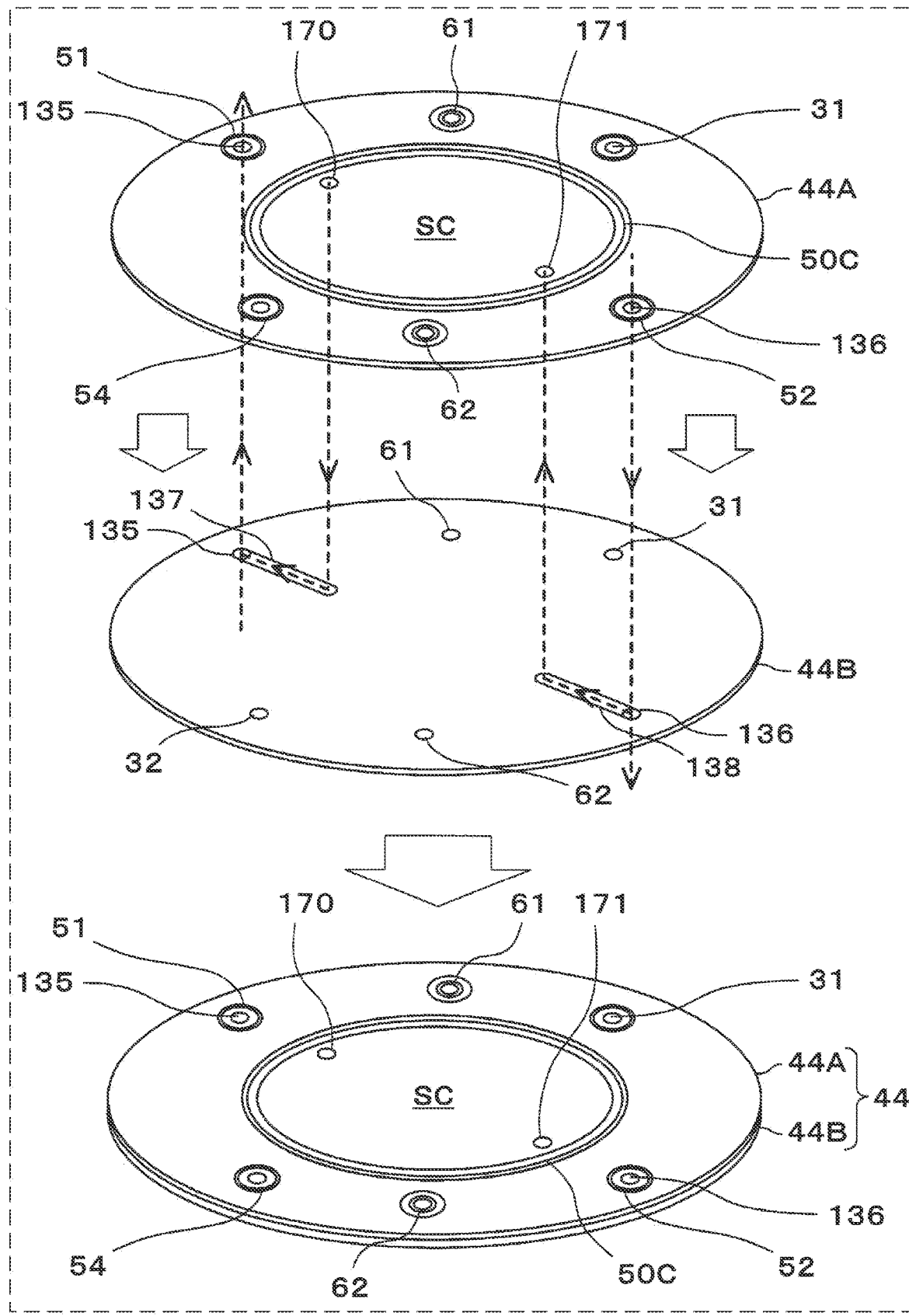
FIG. 6 is an exploded perspective view of the first pressure forming member of FIG. 5.

FIG. 6 is an exploded perspective view of the first pressure forming member of FIG. 5. Specifically, FIG. 6 illustrates a perspective view of a pair of members constituting the first pressure forming member 44 as seen from section VI-VI of FIG. 5 and a diagram of the members integrated with each other. For convenience of explanation, FIG. 5 shows only an O-ring 45C in the first pressure forming member 44. Further, FIG. 6 omits to illustrate an O-ring.

Figure 7:
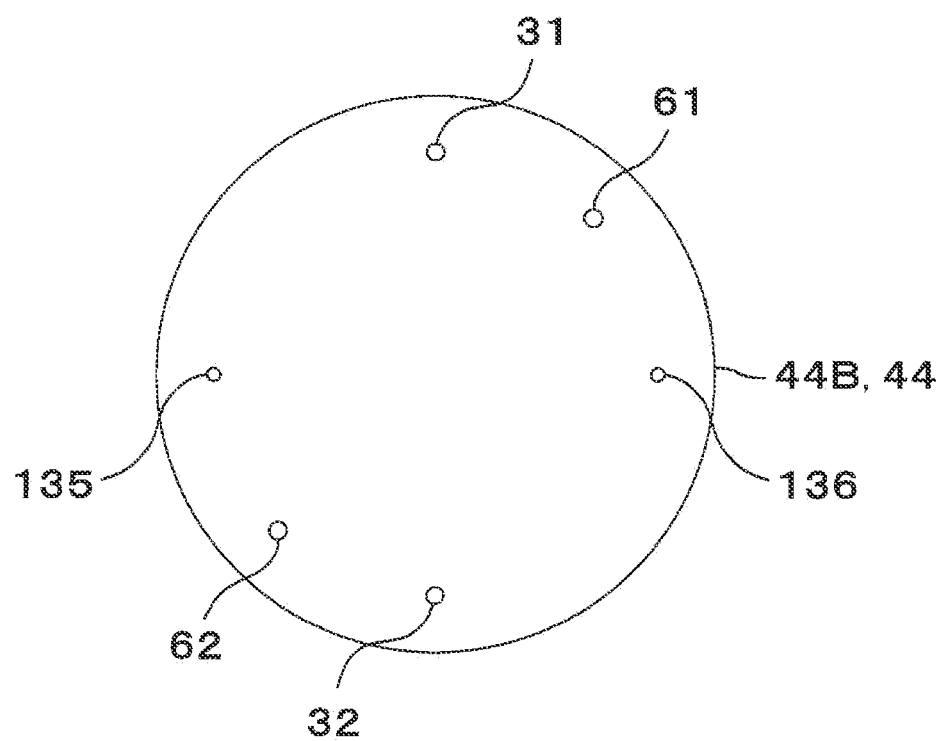
FIG. 7 is a top view of the first pressure forming member of FIG. 5.

FIG. 7 is a top view of the first pressure forming member of FIG. 5. Specifically, FIG. 7 is a plan view of a member constituting the first pressure forming member 44 as seen from section VII-VII of FIG. 5.

As shown in FIGS. 5 and 6, a plate 44A has formed therein the space SC in which to store a cathode gas, and a plate 44B is provided with first and second cathode gas lead-out manifolds 135 and 136 through which the cathode gas flow and a communicating path 138 through which to lead, to the space SC, a portion of the cathode gas having flowed in from the second cathode gas lead-out manifold 136. A portion of the cathode gas having overflowed from the space SC is led to the first cathode gas lead-out manifold 135 through a communicating path 137.

Note here that the configuration of the plate 44A is the same as the configuration of the cathode separator 29A except for the configuration of the O-ring 45C and an O-ring groove 50C to be described below. Specifically, for example, the space S of the cathode separator 29A and the space SC of the plate 44A are identical in shape to each other. Further, the communicating hole 70 of the cathode separator 29A and a communicating hole 170 of the plate 44A are identical in shape to each other, and the communicating hole 71 of the cathode separator 29A and a communicating hole 171 of the plate 44A are identical in shape to each other. Therefore, a detailed description of the configuration of the plate 44A is omitted.

Further, the configuration of the plate 44B is the same as the configuration of the anode separator 29B except that no cooling flow channel is provided in a surface of the plate 44B in which the communicating path 137 and the communicating path 138 are provided and that no anode fluid flow channel is provided in a surface of the plate 44B opposite to the surface in which the communicating path 137 and the communicating path 138. Specifically, for example, the communicating path 37 of the anode separator 29B and the communicating path 137 of the plate 44B are identical in shape to each other, and the communicating path 38 of the anode separator 29B and the communicating path 138 of the plate 44B are identical in shape to each other. Therefore, a detailed description of the configuration of the plate 44B is omitted.

At an appropriate time after the start of hydrogen compression operation of the electrochemical hydrogen pump 100, when the cathode gas generated at the cathode CA passes through the second cathode gas lead-out manifold 136, a portion of the cathode gas having branched off from the second cathode gas lead-out manifold 136 flows through the communicating path 138 and the communicating hole 171 in this order as indicated by a dotted arrow in FIG. 6 and is supplied to the recess (space SC) of the plate 44A. Once the space SC is filled with the cathode gas, a portion of the cathode gas having overflowed from the space SC flows through the communicating hole 170 and the communicating path 137 in this order as indicated by a dotted arrow in FIG. 6 and is led to the first cathode gas lead-out manifold 135.

In this way, the electrochemical hydrogen pump 100 according to the present embodiment can appropriately supply the high-pressure cathode gas to the space SC of the plate 44A from the second cathode gas lead-out manifold 136 of the plate 44B through the communicating path 138 of the plate 44B.

Note here that in the electrochemical hydrogen pump 100 according to the present embodiment, as shown in FIGS. 1 and 5, there is provided the O-ring 45C, provided between the cathode end plate 15 and the cathode separator 29A located at the second end, that surrounds the outer periphery of the space SC in which to store the cathode gas. Specifically, the plate 44A has the O-ring groove 50C, provided in a principal surface thereof in which the space SC is formed (i.e. a principal surface thereof opposite to a joint surface between the plate 44A and the plate 44B), which, when seen in plan view, surrounds a region in the space SC, and the O-ring 45C is retained in the O-ring groove 50C. This causes the high-pressure cathode gas present in the space SC to be sealed in by the O-ring 45C and appropriately prevented from leaking out of a region surrounded by the O-ring 45C. It should be noted that the O-ring 45C corresponds to an example of the "second seal material" of the present disclosure.

Furthermore, as indicated by a dimension L and a dimension LC in FIG. 5, the area of the region surrounded by the O-ring 45C is larger than the area of the region surrounded by the O-ring 45. In the example shown in FIG. 5, the area of a region surrounded by an outer edge of the O-ring 45C is larger than the area of a region surrounded by an outer edge of the O-ring 45.

In this way, the electrochemical hydrogen pump 100 according to the present embodiment is configured such that the outer edge of the O-ring 45 falls within the outer edge of the O-ring 45C in a plan view as seen from an angle parallel with the direction of stacking of the anode separator 29B, the anode AN, the electrolyte membrane 21, the cathode CA, and the cathode separator 29A. In the plan view as seen from an angle parallel with the direction of stacking, the outer edge of the O-ring 45C falls within an outer edge of the cathode separator 29A.

Configuration of Second Pressure Forming Member

Figure 8:
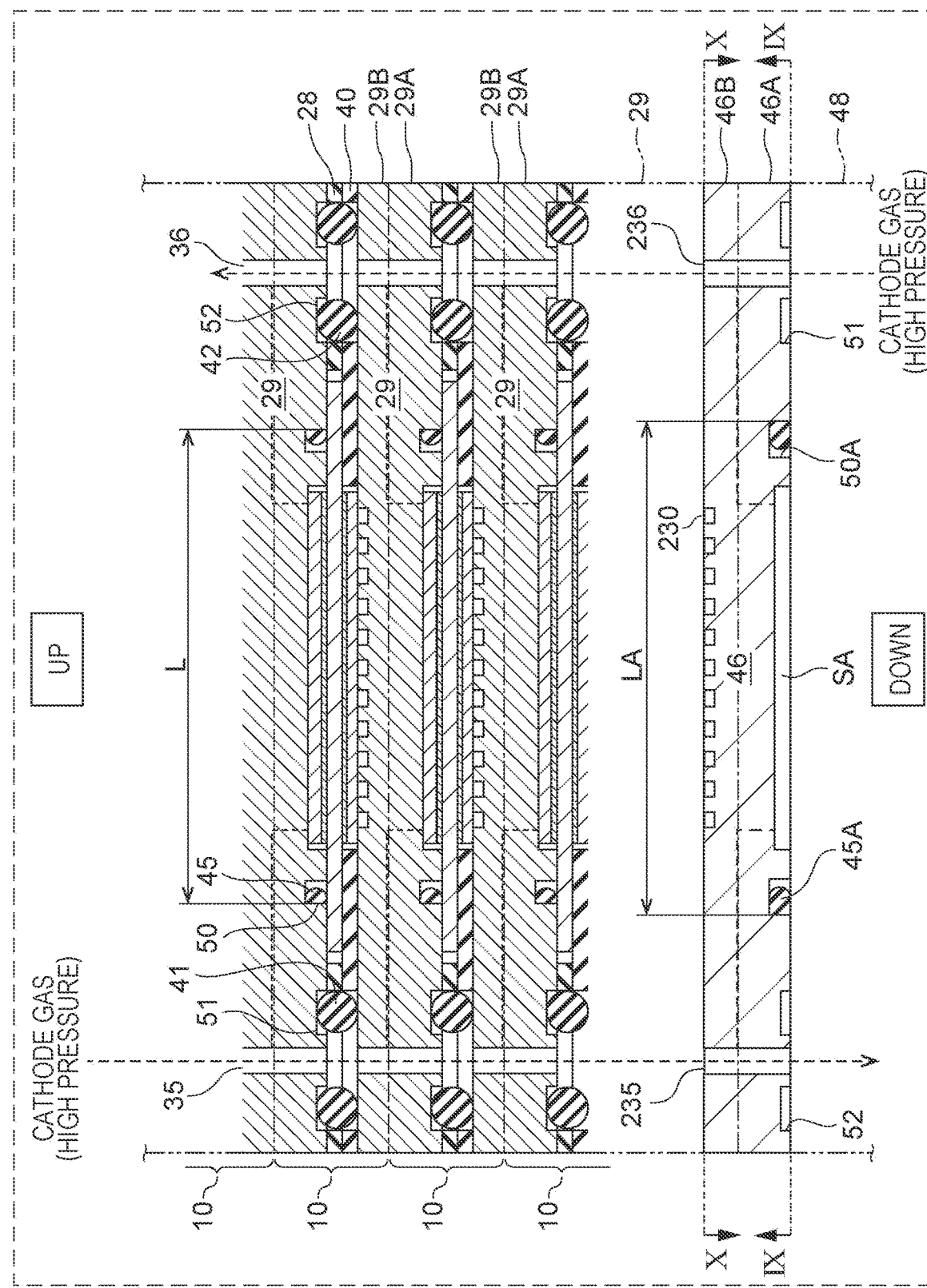
FIG. 8 is a diagram showing an example of a second pressure forming member of FIG. 1 together with the bipolar plates and the hydrogen pump units of FIG. 1.

FIG. 8 is a diagram showing an example of the second pressure forming member of FIG. 1 together with the bipolar plates and the hydrogen pump units of FIG. 1.

Figure 9:
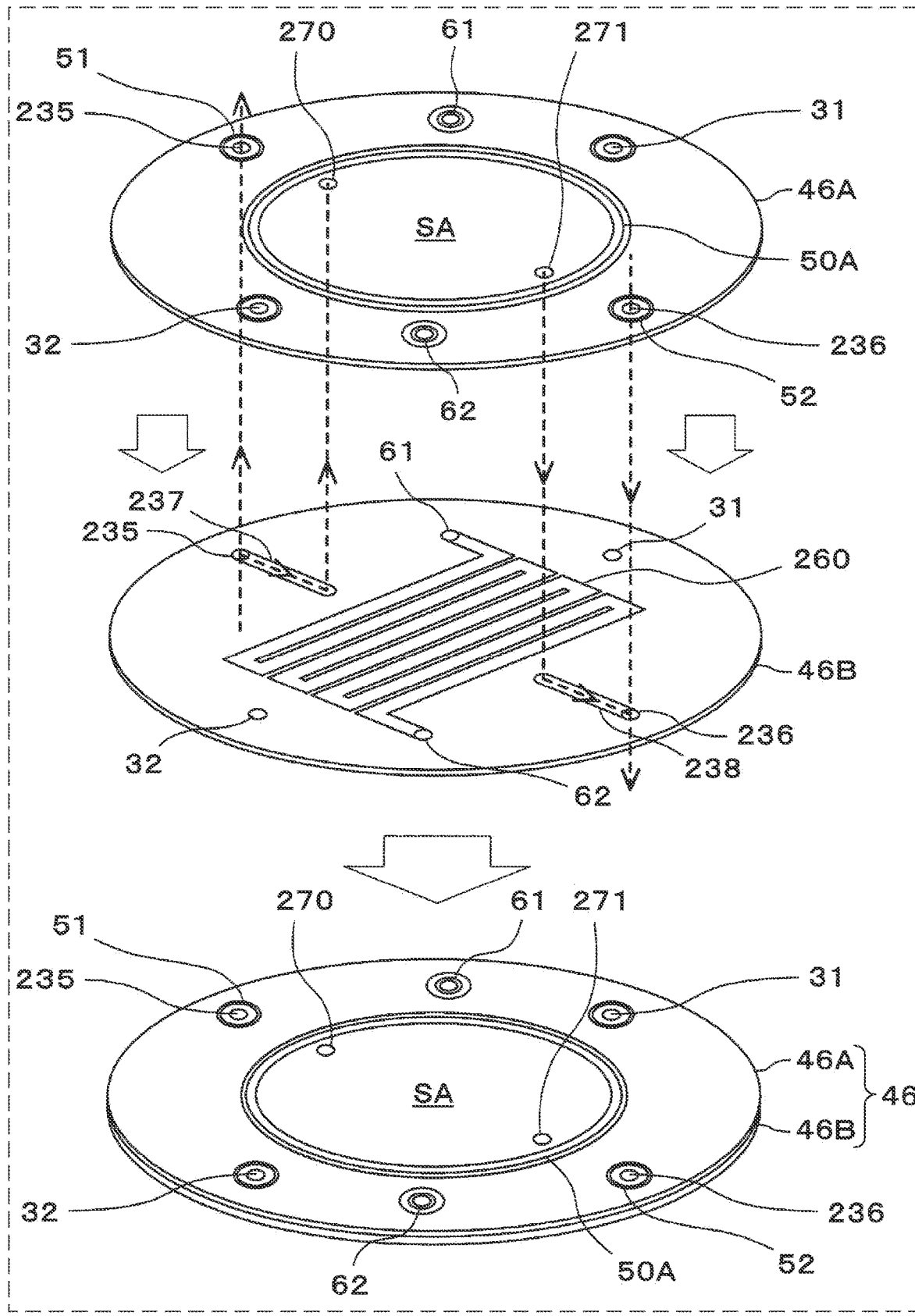
FIG. 9 is an exploded perspective view of the second pressure forming member of FIG. 8.

FIG. 9 is an exploded perspective view of the second pressure forming member of FIG. 8. Specifically, FIG. 9 illustrates a perspective view of a pair of members constituting the second pressure forming member 46 as seen from section IX-IX of FIG. 8 and a diagram of the members integrated with each other. For convenience of explanation, FIG. 8 shows only an O-ring 45A in the second pressure forming member 46. Further, FIG. 9 omits to illustrate an O-ring.

Figure 10:
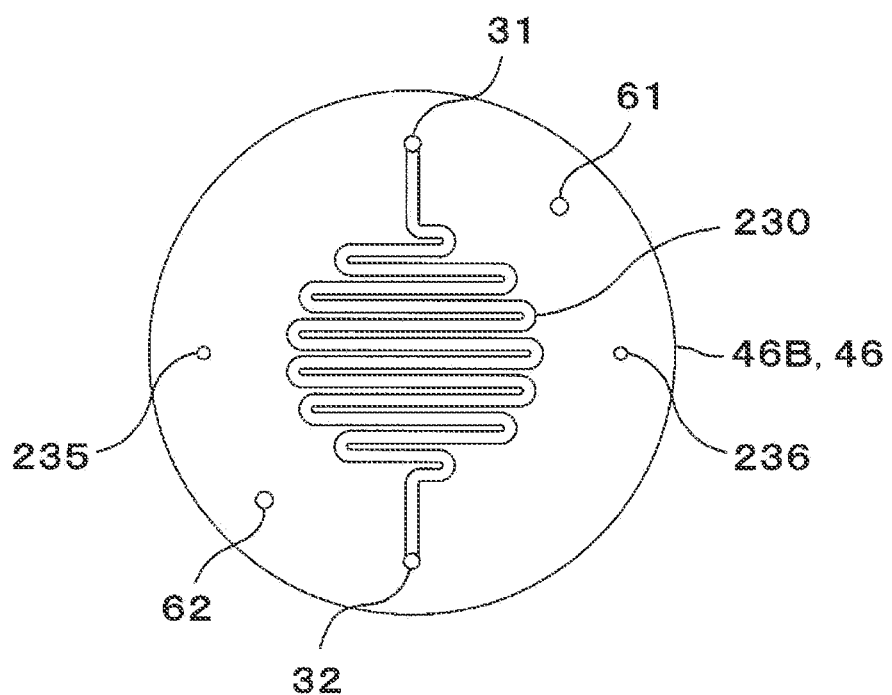
FIG. 10 is a top view of the second pressure forming member of FIG. 8.

FIG. 10 is a top view of the second pressure forming member of FIG. 8. Specifically, FIG. 10 is a plan view of a member constituting the second pressure forming member 46 as seen from section X-X of FIG. 8.

As shown in FIGS. 8 and 9, a plate 46A has formed therein the space SA in which to store the cathode gas, and a plate 46B is provided with first and second cathode gas lead-out manifolds 235 and 236 through which the cathode gas flow and a communicating path 237 through which to lead, to the space SA, a portion of the cathode gas having flowed in from the first cathode gas lead-out manifold 235. A portion of the cathode gas having overflowed from the space SA is led to the second cathode gas lead-out manifold 236 through a communicating path 238.

Note here that the configuration of the plate 46A is the same as the configuration of the cathode separator 29A except for the configuration of the O-ring 45A and an O-ring groove 50A to be described below. Specifically, for example, the space S of the cathode separator 29A and the space SA of the plate 46A are identical in shape to each other. Further, the communicating hole 70 of the cathode separator 29A and a communicating hole 270 of the plate 46A are identical in shape to each other, and the communicating hole 71 of the cathode separator 29A and a communicating hole 271 of the plate 46A are identical in shape to each other. Therefore, a detailed description of the configuration of the plate 46A is omitted.

Further, the configuration of the plate 46B is the same as the configuration of the anode separator 29B. Specifically, for example, the communicating path 37 of the anode separator 29B and the communicating path 237 of the plate 46B are identical in shape to each other, and the communicating path 38 of the anode separator 29B and the communicating path 238 of the plate 46B are identical in shape to each other. Further, as with the case of the anode separator 29B, the plate 46B has a cooling flow channel 260 (see FIG. 9) provided in a surface of the plate 46B in which the communicating path 237 and the communicating path 238 are provided and an anode gas flow channel 230 (see FIG. 10) provided in a surface of the plate 46B opposite to the surface in which the communicating path 237 and the communicating path 238 are provided. That is, the plate 46B corresponds to the "anode separator located at a first end" of the present disclosure. Therefore, a detailed description of the configuration of the plate 46B is omitted.

At an appropriate time after the start of hydrogen compression operation of the electrochemical hydrogen pump 100, when the cathode gas generated at the cathode CA passes through the first cathode gas lead-out manifold 235, a portion of the cathode gas having branched off from the first cathode gas lead-out manifold 235 flows through the communicating path 237 and the communicating hole 270 in this order as indicated by a dotted arrow in FIG. 9 and is supplied to the recess (space SA) of the plate 46A. Once the space SA is filled with the cathode gas, a portion of the cathode gas having overflowed from the space SA flows through the communicating hole 271 and the communicating path 238 in this order as indicated by a dotted arrow in FIG. 9 and is led to the second cathode gas lead-out manifold 236.

In this way, the electrochemical hydrogen pump 100 according to the present embodiment can appropriately supply the high-pressure cathode gas to the space SA of the plate 46A from the first cathode gas lead-out manifold 235 of the plate 46B through the communicating path 237 of the plate 46B.

Note here that in the electrochemical hydrogen pump 100 according to the present embodiment, as shown in FIGS. 1 and 8, there is provided the O-ring 45A, provided between the anode end plate 16 and the anode separator (in the present example, the plate 46B) located at the first end, that surrounds the outer periphery of the space SA in which to store a cathode gas. Specifically, the plate 46A has the O-ring groove 50A, provided in a principal surface thereof in which the space SA is formed (i.e. a principal surface thereof opposite to a joint surface between the plate 46A and the plate 46B), which, when seen in plan view, surrounds a region in the space SA, and the O-ring 45A is retained in the O-ring groove 50A. This causes the high-pressure cathode gas present in the space SA to be sealed in by the O-ring 45A and appropriately prevented from leaking out of a region surrounded by the O-ring 45A. It should be noted that the O-ring 45A corresponds to an example of the "third seal material" of the present disclosure.

Furthermore, as indicated by a dimension L and a dimension LA in FIG. 8, the area of the region surrounded by the O-ring 45A is larger than the area of the region surrounded by the O-ring 45. In the example shown in FIG. 8, the area of a region surrounded by an outer edge of the O-ring 45A is larger than the area of a region surrounded by an outer edge of the O-ring 45.

In this way, the electrochemical hydrogen pump 100 according to the present embodiment is configured such that the outer edge of the O-ring 45 falls within the outer edge of the O-ring 45A in a plan view as seen from an angle parallel with the direction of stacking of the anode separator 29B, the anode AN, the electrolyte membrane 21, the cathode CA, and the cathode separator 29A. In the plan view as seen from an angle parallel with the direction of stacking, the outer edge of the O-ring 45A falls within an outer edge of the cathode separator 29A.

As noted above, the electrochemical hydrogen pump 100 according to the present embodiment makes it possible to more appropriately reduce contact resistance between members constituting a hydrogen pump unit 10 than has conventionally been the case.

Specifically, the gas pressure of the cathode gas in the region surrounded by the O-ring 45C is a high pressure about equal to the gas pressure of the cathode gas in the region surrounded by the O-ring 45 in the hydrogen pump unit 10. Further, a load that is applied to the cathode separator 29A by the gas pressure of the cathode gas in the region surrounded by the O-ring 45C acts in such a manner as to inhibit the cathode separator 29A from bending toward the cathode end plate 15 due to the gas pressure of the cathode gas in the region surrounded by the O-ring 45. This allows the electrochemical hydrogen pump 100 according to the present embodiment to make it hard for a gap to be formed between members constituting the hydrogen pump unit 10.

Note here that if the area of the region surrounded by the O-ring 45C is smaller than the area of the region surrounded by the O-ring 45, part of the region surrounded by the O-ring 45, when seen in plan view, does not fall within the region surrounded by the O-ring 45C. This may cause part of the cathode separator 29A that faces the aforementioned part of the region to bend toward the cathode end plate 15.

On the other hand, by being configured such that the area of the region surrounded by the O-ring 45C is larger than the area of the region surrounded by the O-ring 45, the electrochemical hydrogen pump 100 according to the present embodiment allows the latter region to be completely accommodated by the former region in plan view. This allows the electrochemical hydrogen pump 100 according to the present embodiment to apply, to the whole area of the cathode separator 29A that faces the region surrounded by the O-ring 45, a load that inhibits the aforementioned bending deformation, thus making it possible to more appropriately reduce contact resistance between members constituting the hydrogen pump unit 10 than has conventionally been the case.

Furthermore, the gas pressure of the cathode gas in the region surrounded by the O-ring 45A is a high pressure about equal to the gas pressure of the cathode gas in the region surrounded by the O-ring 45 in the hydrogen pump unit 10. Further, a load that is applied to the anode separator by the gas pressure of the cathode gas in the region surrounded by the O-ring 45A acts in such a manner as to inhibit the anode separator from bending toward the anode end plate 16 due to the gas pressure of the cathode gas in the region surrounded by the O-ring 45. This allows the electrochemical hydrogen pump 100 according to the present embodiment to make it hard for a gap to be formed between members constituting the hydrogen pump unit 10.

Note here that if the area of the region surrounded by the O-ring 45A is smaller than the area of the region surrounded by the O-ring 45, part of the region surrounded by the O-ring 45, when seen in plan view, does not fall within the region surrounded by the O-ring 45A. This may cause part of the anode separator that faces the aforementioned part of the region to bend toward the anode end plate 16.

On the other hand, by being configured such that the area of the region surrounded by the O-ring 45A is larger than the area of the region surrounded by the O-ring 45, the electrochemical hydrogen pump 100 according to the present embodiment allows the latter region to be completely accommodated by the former region in plan view. This allows the electrochemical hydrogen pump 100 according to the present embodiment to apply, to the whole area of the anode separator that faces the region surrounded by the O-ring 45, a load that inhibits the aforementioned bending deformation, thus making it possible to more appropriately reduce contact resistance between members constituting the hydrogen pump unit 10 than has conventionally been the case.

For example, in the example shown in FIG. 5, if the area of the region surrounded by the outer edge of the O-ring 45C is smaller than the area of the region surrounded by the outer edge of the O-ring 45, part of the region surrounded by the outer edge of the O-ring 45, when seen in plan view, does not fall within the region surrounded by the outer edge of the O-ring 45C.

This may cause a portion of the cathode separator 29A that faces the part of the foregoing region to bend toward the cathode end plate 15. On the other hand, by being configured such that the area of the region surrounded by the outer edge of the O-ring 45C is larger than the area of the region surrounded by the outer edge of the O-ring 45 as shown in FIG. 5, the electrochemical hydrogen pump 100 according to the present embodiment can alleviate such inconvenience. Specifically, by being configured such that the outer edge of the O-ring 45 falls within the outer edge of the O-ring 45C in a plan view as seen from an angle parallel with the direction of stacking of the anode separator 29B, the anode AN, the electrolyte membrane 21, the cathode CA, and the cathode separator 29A, the electrochemical hydrogen pump 100 according to the present embodiment can apply, to the whole area of the cathode separator 29A that faces the region surrounded by the outer edge of the O-ring 45, a load that inhibits the aforementioned bending deformation.

It should be noted that it is for the following reason that the foregoing magnitude relationship between the areas of the regions is defined with reference to the respective outer edges of the O-ring 45 and the O-ring 45C.

The O-ring 45 and the O-ring 45C exert seal forces by being vertically crushed by pressing forces of members that are in contact with the O-ring 45 and the O-ring 45C. During hydrogen compression operation of the electrochemical hydrogen pump 100, the gas pressure of the cathode gas is applied to the O-ring 45C (as well as the O-ring 45) in a direction (horizontal direction) from the inner edge toward the outer edge as indicated by thin arrows in an enlarged view of FIG. 5, so that the O-ring 45C is compressed and deformed into close contact with a side part of the O-ring groove 50C. Then, in such a direction that the wire diameter of the O-ring 45C vertically expands, the elastic force of the O-ring 45C acts on the members that are in contact with the O-ring 45C. In other words, as indicated by thick arrows in the enlarged view of FIG. 5, the elastic force of the O-ring 45C generated by the gas pressure and seal force of the cathode gas acts in upward and downward directions on the plate 44A and the cathode separator 29A, which are in contact with the O-ring 45C in a region within the outer edge of the O-ring 45C, respectively. Moreover, this means that it is appropriate to define the foregoing magnitude relationship between the areas of the regions with reference to the respective outer edges of the O-ring 45 and the O-ring 45C in deriving pressing forces that act on members constituting the hydrogen pump unit 10.

Further, in the example shown in FIG. 8, if the area of the region surrounded by the outer edge of the O-ring 45A is smaller than the area of the region surrounded by the outer edge of the O-ring 45, part of the region surrounded by the outer edge of the O-ring 45, when seen in plan view, does not fall within the region surrounded by the outer edge of the O-ring 45A.

This may cause a portion of the anode separator that faces the part of the foregoing region to bend toward the anode end plate 16. On the other hand, by being configured such that the area of the region surrounded by the outer edge of the O-ring 45A is larger than the area of the region surrounded by the outer edge of the O-ring 45 as shown in FIG. 8, the electrochemical hydrogen pump 100 according to the present embodiment can alleviate such inconvenience. Specifically, by being configured such that the outer edge of the O-ring 45 falls within the outer edge of the O-ring 45A in a plan view as seen from an angle parallel with the direction of stacking of the anode separator 29B, the anode AN, the electrolyte membrane 21, the cathode CA, and the cathode separator 29A, the electrochemical hydrogen pump 100 according to the present embodiment can apply, to the whole area of the anode separator that faces the region surrounded by the outer edge of the O-ring 45, a load that inhibits the aforementioned bending deformation.

First Example

An electrochemical hydrogen pump 100 according to the present example is the same as the electrochemical hydrogen pump 100 according to the first embodiment except that the dimension L (diameter) of the region surrounded by the outer edge of the O-ring 45 and the respective dimensions LC and LA (diameters) of the regions surrounded by the respective outer edges of the O-rings 45C and 45A are set as below.

As noted above, in the region surrounded by the outer edge of the O-ring 45 in each of the hydrogen pump units 10, the pressure of the cathode gas exerts such a force F1 on the cathode end plate 15 and anode end plate 16 of the electrochemical hydrogen pump 100 during hydrogen compression operation of the electrochemical hydrogen pump 100 that the cathode end plate 15 and the anode end plate 16 bulge outward.

Assuming here that A1 is the area in plan view of the region surrounded by the outer edge of the O-ring 45 and P is the pressure of the cathode gas, the force F1 is expressed by Formula (1) as follows:

$$F1 = P \times A1 \quad (1)$$

where $A1 = \pi \times (L/2)^2$

Further, as noted above, in the regions surrounded by the outer edges of the O-rings 45C and 45A in the first and second pressure forming members 44 and 46, the pressure of the cathode gas exerts forces F2 and F3 in such directions during hydrogen compression operation of the electrochemical hydrogen pump 100 as to inhibit the deformation of members constituting the hydrogen pump unit 10 and bring these members into close contact with each other, respectively.

Assuming here that A2 is the area in plan view of the region surrounded by the outer edge of the O-ring 45C and P is the pressure of the cathode gas, the force F2 is expressed by Formula (2) as follows:

$$F2 = P \times A2 \quad (2)$$

where $A2 = \pi \times (LC/2)^2$

Assuming here that A3 is the area in plan view of the region surrounded by the outer edge of the O-ring 45A and P is the pressure of the cathode gas, the force F3 is expressed by Formula (3) as follows:

$$F3 = P \times A3 \quad (3)$$

where $A3 = \pi \times (LA/2)^2$

Moreover, in the electrochemical hydrogen pump 100 according to the present example, since LC>L and LA>L, the forces F2 and F3, which are exerted by the pressure P of the cathode gas in such directions as to inhibit the deformation of members constituting the hydrogen pump unit 10 and bring these members into close contact with each other, are greater than the force F1, which is exerted by the pressure P of the cathode gas on the cathode end plate 15 and anode end plate 16 of the electrochemical hydrogen pump 100 such that the cathode end plate 15 and the anode end plate 16 bulge outward. This makes it possible to appropriately inhibit an increase in contact resistance between members constituting the hydrogen pump unit 10.

As one example, a load (F2−F1) on the cathode separator 29A in a case where the dimension LC of the first pressure forming member 44 is set at 120 mm and the dimension L of each of the hydrogen pump units 10 is set at 117 mm and in a case where the pressure P of the cathode gas is 40 MPa is estimated to be 22 kN. That is, it was found that it is a slight dimensional difference (of approximately 3 mm) between the dimension LC and the dimension L that produces a pressing force equivalent to approximately 2 MPa against the cathode separator 29A. Moreover, this pressing force is considered to be an appropriate value as a force that brings members constituting the hydrogen pump unit 10 into close contact with each other.

It should be noted that the various numerical values described above are just a few examples and are not limited to the present example. For example, the pressure P of the cathode gas can be set at an appropriate value on the basis of the specifications, operating conditions, or other features of the electrochemical hydrogen pump 100.

Thus, the electrochemical hydrogen pump 100 according to the present example can more easily achieve reductions in size and cost of the apparatus than a water electrolysis apparatus, disclosed in "Study of Seal Structure of High-differential-pressure Water Electrolysis Cell", Honda Motor Co., Ltd., Honda R&D Technical Review Vol. 25 No. 2 (October 2013), in which an separator is completely inserted in a circular cylindrical recess (high-pressure space) formed in a central part of a bottom surface of an end plate.

The electrochemical hydrogen pump 100 according to the present example may be the same as the electrochemical hydrogen pump 100 according to the first embodiment except for the aforementioned features.

Second Example

In an electrochemical hydrogen pump 100, it is necessary that the contact resistance between members constituting a hydrogen pump unit 10 be always kept at a desired value or lower in order for a cathode gas that is generated at the cathode CA to be highly efficiently compressed from normal pressure to several tens of megapascals.

Note here that as described in the first example, when the pressure of the cathode gas that is generated at the cathode CA is high (e.g. approximately several tens of megapascals), the effects of pressure of the first and second pressure forming members 44 and 46 make it possible to apply a sufficient pressing force to members constituting the hydrogen pump unit 10 to bring these members into close contact with each other.

However, in a case where the pressure of the cathode gas that is generated at the cathode CA is low, it is difficult to apply such a pressing force to members constituting the hydrogen pump unit 10.

To address this problem, an electrochemical hydrogen pump 100 according to the present example is configured such that even in a case where the pressure of the cathode gas that is generated at the cathode CA is low, the fastening power of the fastener 17 brings members constituting the hydrogen pump unit 10 into close contact with each other.

Examples of a method that involves the use of the fastener 17 to apply the predetermined fastening force to members constituting the hydrogen pump unit 10 include, but are not limited to, a method that involves the application of axial forces to the bolts of the fastener 17, a method that involves the utilization of spring forces, and a method that involves the application of axial forces by fastening torque management.

It should be noted that tensile stress is applied to the bolts of the fastener 17 due to the predetermined fastening power and the gas pressure of a cathode gas that is generated at the cathode CA of the electrochemical hydrogen pump 100. For this reason, the fastener 17 may have the strength to be able to withstand this tensile stress. For example, although approximately ten bolts may be evenly provided around the end plates, this is not intended to impose any limitation. Further, although the bolts may be constituted by steel materials (such as stainless steel) classified under strength heading 10.9 (JIS B1051), this is not intended to impose any limitation.

The electrochemical hydrogen pump 100 according to the present example may be the same as the electrochemical hydrogen pump 100 according to the first embodiment or the first example of the first embodiment except for the aforementioned features.

Modifications

Although, in the electrochemical hydrogen pump 100 according to the first embodiment, the first pressure forming member 44 and the second pressure forming member 46 are disposed above and below the stack of hydrogen pump units 10, respectively, this is not intended to impose any limitation. A pressure forming member may be disposed only either above or below the stack. In this case, by making the bending rigidity of the end plate on which no pressure forming member is disposed higher than the bending rigidity of the end plate on which the pressure forming member is disposed, the end plates are allowed to face each other.

The electrochemical hydrogen pump 100 according to the present modification may be the same as the electrochemical hydrogen pump 100 according to any of the first embodiment and the first and second examples of the first embodiment except for the aforementioned features.

Second Embodiment

An electrochemical hydrogen pump 100 according to a second embodiment is the same as the electrochemical hydrogen pump 100 according to the first embodiment except that a ring material 90 to be described below is provided on the outer edge of the O-ring 45C.

Figure 11:
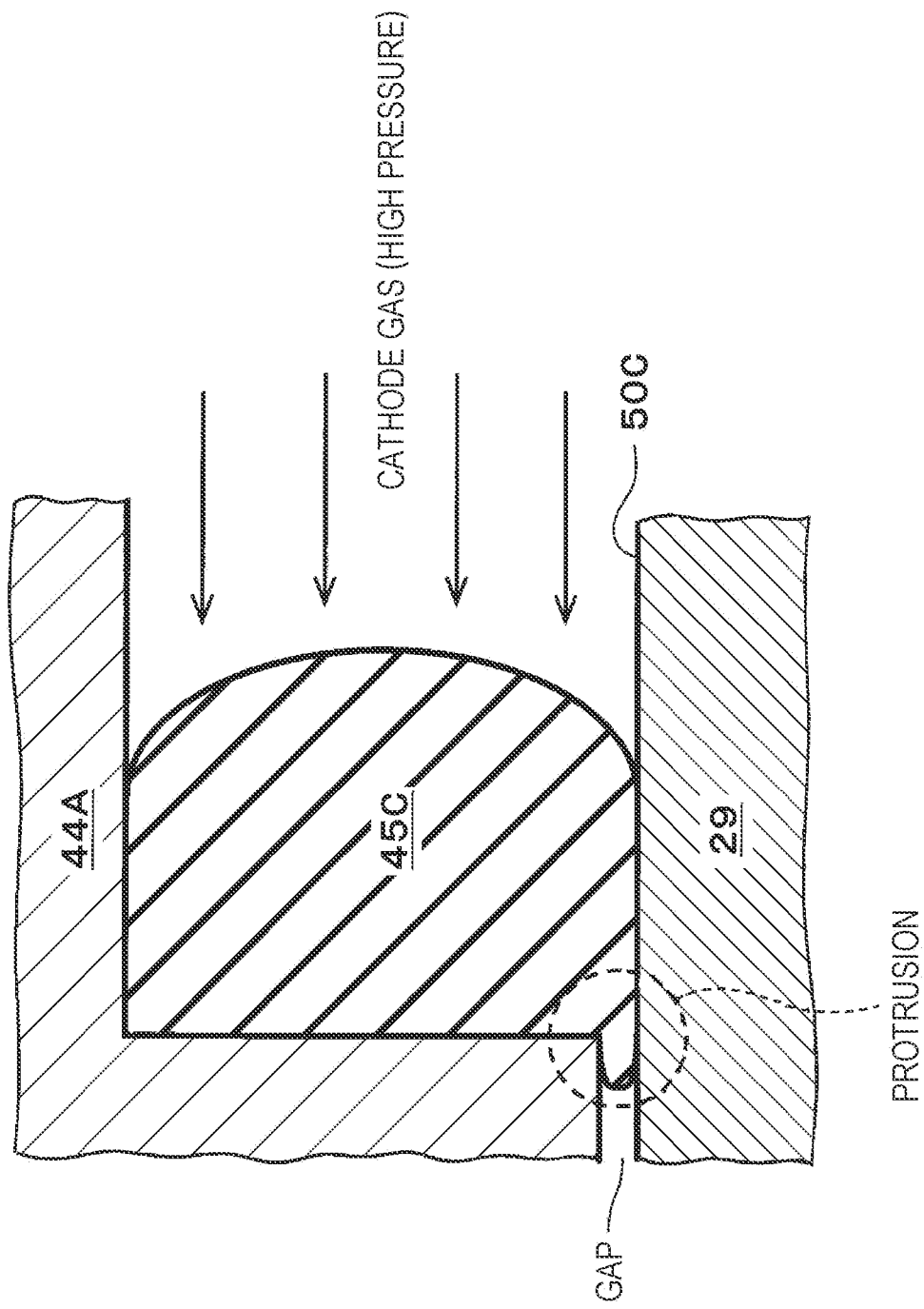
FIG. 11 is a diagram showing an example of a phenomenon in which part of an O-ring protrudes into a gap due to a high-pressure cathode gas present in the O-ring.

FIG. 11 is a diagram showing an example of a phenomenon in which part of an O-ring protrudes into a gap due to a high-pressure cathode gas present in the O-ring.

Figure 12:
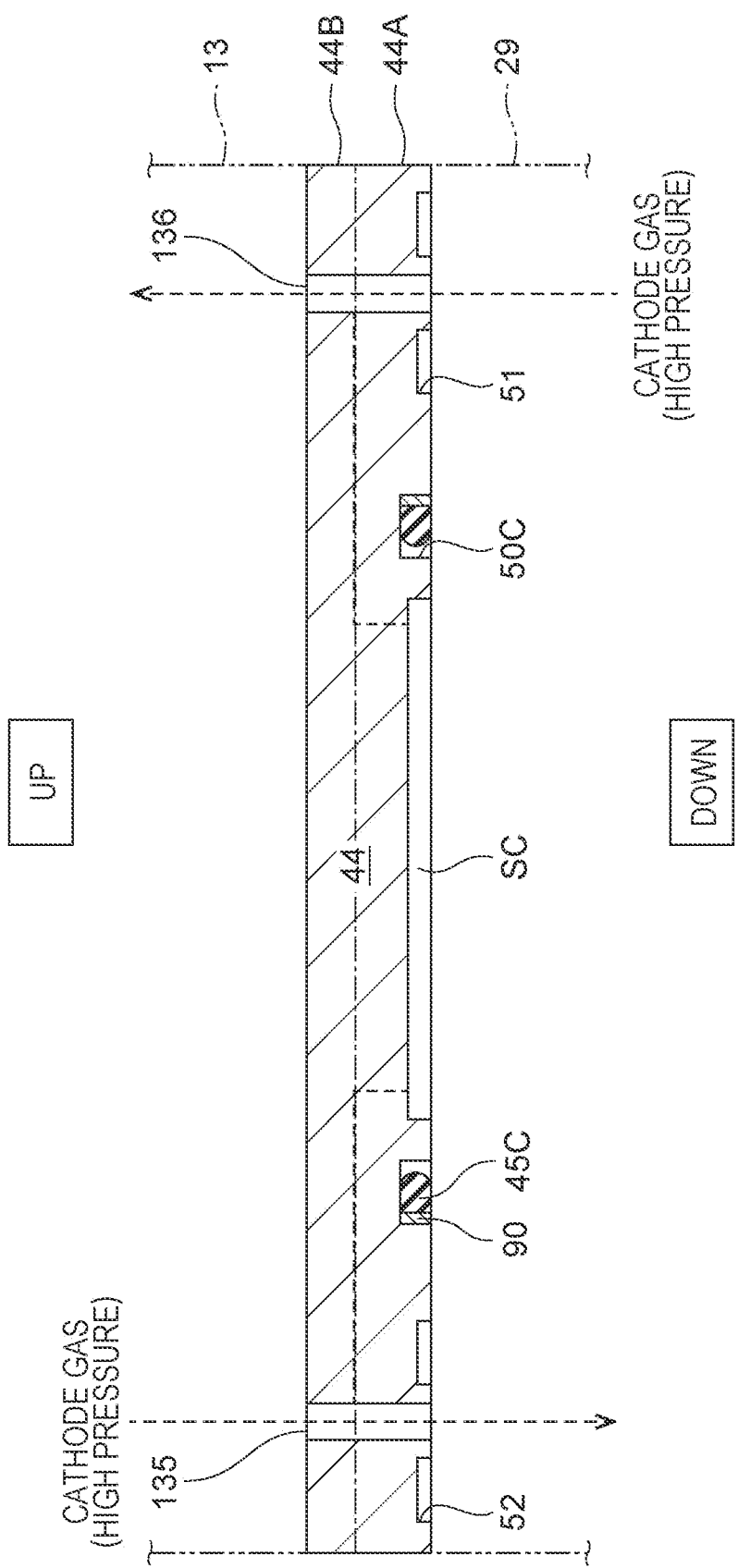
FIG. 12 is a diagram showing an example of a first pressure forming member in an electrochemical hydrogen pump according to a second embodiment.

FIG. 12 is a diagram showing an example of a first pressure forming member in an electrochemical hydrogen pump according to a second embodiment.

As shown in FIG. 12, the ring material 90 is a backup ring that is adjacent to the outer edge of the O-ring 45C and that surrounds the O-ring 45C. The ring material 90 is retained in the O-ring groove 50C. It should be noted that possible examples of a base material from which the ring material 90 is made include, but are not limited to, fluororesin from the point of view of acid resistance and hydrogen brittleness resistance.

Note here that when the space SC is sealed with the O-ring 45C, the gas pressure of the cathode gas in the region surrounded by the O-ring 45C may cause a gap to be formed as shown in FIG. 11 between the members that are in contact with the O-ring 45C. In this case, when no ring material surrounding the O-ring 45C is provided, the gas pressure of the cathode gas present in the O-ring 45C may cause part of the O-ring 45C to protrude into the aforementioned gap (see FIG. 11). This may cause damage to the O-ring 45C, thereby impairing the gas sealability of the O-ring 45C.

On the other hand, by being configured such that a ring material 90 surrounding the O-ring 45C is provided adjacent to the outer edge of the O-ring 45C, the electrochemical hydrogen pump 100 according to the present embodiment inhibits the O-ring 45C from protruding into the aforementioned gap, thus causing less damage to the O-ring 45C.

The electrochemical hydrogen pump 100 according to the present embodiment may be the same as the electrochemical hydrogen pump 100 according to any of the first embodiment, the first and second examples of the first embodiment, and the modification of the first embodiment except for the aforementioned features.

First Modification

An electrochemical hydrogen pump 100 according to the present modification is the same as the electrochemical hydrogen pump 100 according to the first embodiment except that a ring material 91 to be described below is provided on the outer edge of the O-ring 45A.

Figure 13:
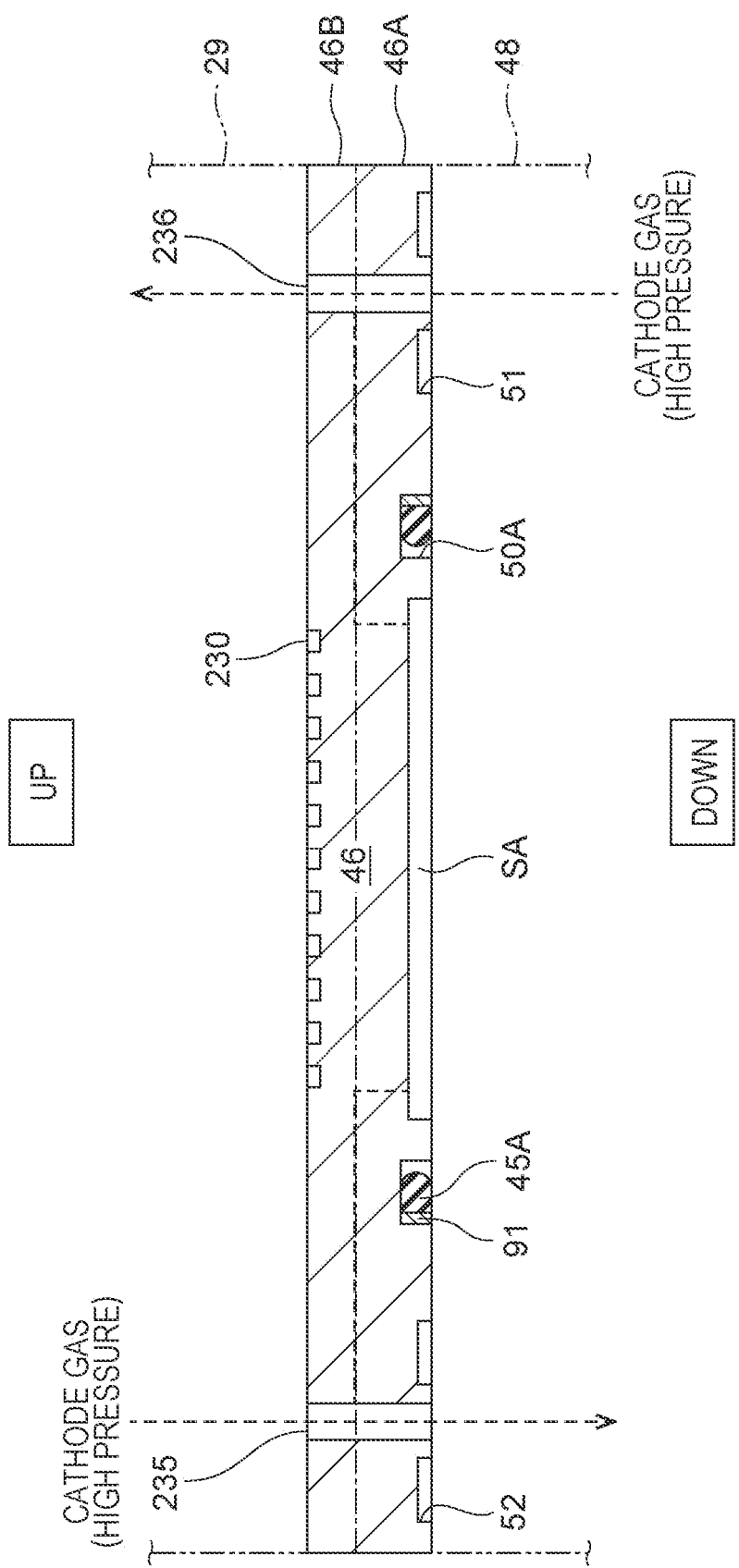
FIG. 13 is a diagram showing an example of a second pressure forming member in an electrochemical hydrogen pump according to a first modification of the second embodiment.

FIG. 13 is a diagram showing an example of a second pressure forming member in an electrochemical hydrogen pump according to a first modification of the second embodiment.

As shown in FIG. 13, the ring material 91 is a backup ring that is adjacent to the outer edge of the O-ring 45A and that surrounds the O-ring 45A. The ring material 91 is retained in the O-ring groove 50A. It should be noted that possible examples of a base material from which the ring material 91 is made include, but are not limited to, fluororesin from the point of view of acid resistance and hydrogen brittleness resistance.

A description of working effects that are brought about by the electrochemical hydrogen pump 100 according to the present modification is omitted, as they are the same as those which are brought about by the electrochemical hydrogen pump 100 according to the second embodiment.

The electrochemical hydrogen pump 100 according to the present modification may be the same as the electrochemical hydrogen pump 100 according to any of the first embodiment, the first and second examples of the first embodiment, the modification of the first embodiment, and the second embodiment except for the aforementioned features.

Second Modification

In the electrochemical hydrogen pump 100 according to the present modification, no ring material surrounding the O-ring 45 is provided on the outer edge of the O-ring 45.

When the cathode CA is sealed with the O-ring 45, the members that are in contact with the O-ring 45 less bend toward the end plate than those which are in contact with the O-rings 45C and 45A, with the result that it is hard for a gap to be formed between the members that are in contact with the O-ring 45. For this reason, even in a case where no ring material surrounding the O-ring 45 is provided, there is only a low possibility of the O-ring 45 being damaged by the gas pressure of the cathode gas present in the O-ring 45. Accordingly, by being configured such that no ring material surrounding the O-ring 45 is provided on the outer edge of the O-ring 45, the electrochemical hydrogen pump 100 according to the present modification makes it possible to reduce the number of ring material components.

The electrochemical hydrogen pump 100 according to the present modification may be the same as the electrochemical hydrogen pump 100 according to any of the first embodiment, the first and second examples of the first embodiment, the modification of the first embodiment, the second embodiment, and the first modification of the second embodiment except for the aforementioned features.

Third Modification

An electrochemical hydrogen pump 100 according to the present modification is the same as the electrochemical hydrogen pump 100 according to the first embodiment except that the types (series) and wire diameters (thicknesses) of the O-rings 45, 45C, and 45A are set as below.

In the electrochemical hydrogen pump 100 according to the present modification, the length (wire diameter) from the inner edge to the outer edge of the O-ring 45C is greater than the length (wire diameter) from the inner edge to the outer edge of the O-ring 45.

The gas pressure of the cathode gas in the region surrounded by the O-ring 45C may cause the members that are in contact with the O-ring 45C to bend toward the cathode end plate 15 to cause a gap to be formed between the members; on the other hand, the members that are in contact with the O-ring 45 less bend toward the cathode end plate 15 than those which are in contact with the O-ring 45C, with the result that it is hard for a gap to be formed between the members that are in contact with the O-ring 45. Moreover, when a gap is formed between the members that are in contact with the O-ring 45C, the high-pressure cathode gas present in the O-ring 45C may cause, for example, part of the O-ring 45C to protrude into this gap as shown in FIG. 11. This may cause damage to the O-ring 45C, thereby impairing the gas sealability of the O-ring 45C.

To address this problem, the electrochemical hydrogen pump 100 according to the present modification is configured such that the O-ring 45C is larger in wire diameter than the O-ring 45 as noted above. This allows the O-ring 45C to be higher in durability than in a case where the wire diameter of the O-ring 45C is smaller than the wire diameter of the O-ring 45. Specifically, this causes less damage to the O-ring 45C, as a larger wire diameter of the O-ring 45C makes it harder for the O-ring 45C to protrude into the aforementioned gap.

Further, in the electrochemical hydrogen pump 100 according to the present modification, the length (wire diameter) from the inner edge to the outer edge of the O-ring 45A is greater than the length (wire diameter) from the inner edge to the outer edge of the O-ring 45.

In this way, by being configured such that the wire diameter of the O-ring 45A is larger than the wire diameter of the O-ring 45, the electrochemical hydrogen pump 100 according to the present modification can be higher in durability of the O-ring 45A than in a case where the wire diameter of the O-ring 45A is smaller than the wire diameter of the O-ring 45. It should be noted that the details of the working effects that are brought about by the present configuration are omitted, as they can be easily understood from the above description.

Note here that the O-ring 45, the O-ring 45C, and the O-ring 45A may be of any type as long as they satisfy the aforementioned magnitude relationship between the wire diameters.

As one example, O-rings of the G standard (JIS B2401; for use in plane fixing: wire diameter of 3.1 mm) or other O-rings may be used as the O-ring 45C and the O-ring 45A. In this case, an O-ring of the S standard (JIS B2401; for use in plane fixing: wire diameter of 2.0 mm) that is lower in cost than that of the G standard or other O-rings may be used as the O-ring 45.

Note, however, that the types of O-rings are not limited to the aforementioned types. For example, the types of O-rings 45C and 45A may be of the G standard (wire diameter of 5.7 mm), the GS standard (wire diameter of 3.1 mm), the V standard (wire diameter of, for example, 4 mm), the N standard (wire diameter of, for example, 5 mm), or other standards. Alternatively, the types of O-rings 45C and 45A may be of a foreign standard. The type of O-ring 45 may be of the G standard (wire diameter of 3.1 mm), or may be of a foreign standard.

The electrochemical hydrogen pump 100 according to the present modification may be the same as the electrochemical hydrogen pump 100 according to any of the first embodiment, the first and second examples of the first embodiment, the modification of the first embodiment, the second embodiment, and the first and second modifications of the second embodiment except for the aforementioned features.

The first embodiment, the first and second examples of the first embodiment, the modification of the first embodiment, the second embodiment, and the first to third modifications of the second embodiment may be combined with each other unless they mutually exclude each other.

Further, it is obvious to persons skilled in the art from the above description that there are many improvements to the present disclosure and other embodiments of the present disclosure. Accordingly, the above description should be interpreted as illustrative, and is provided for the purpose of teaching persons skilled in the art the best mode of carrying out the present disclosure. The details of a structure and/or a function of the present disclosure can be substantially changed without departing from the spirit of the present disclosure. For example, the seal configuration of an electrochemical hydrogen pump 100 is also applicable to another compression apparatus such as a water electrolysis apparatus.

An aspect of the present disclosure is applicable to a compression apparatus that makes it possible to more appropriately reduce contact resistance between members constituting a compression unit than has conventionally been the case.

What is claimed is:
1. A compression apparatus comprising:
   at least one compression unit including an electrolyte membrane, an anode provided on a first principal surface of the electrolyte membrane, a cathode provided on a second principal surface of the electrolyte membrane, an anode separator provided on the anode, and a cathode separator provided on the cathode;
   a voltage applier that applies a voltage between the anode and the cathode;
   an anode end plate provided on the anode separator located at a first end in a direction of stacking;
   a cathode end plate provided on the cathode separator located at a second end in the direction of stacking;
   a first seal material that surrounds an outer periphery of the cathode;
   a second seal material that surrounds an outer periphery of a first space in which to store compressed hydrogen, the first space being provided between the cathode end plate and the cathode separator located at the second end, the first space being provided at a position facing to the cathode separator; and
   a first plate provided between the cathode end plate and the cathode separator positioned at the second end, wherein:
   the first space is a recess formed in the first plate and facing to the cathode separator,
   the second seal material is disposed in a groove formed in the first plate at a periphery of the recess,
   the compression apparatus causes, by using the voltage applier to apply a voltage, protons taken out from an anode fluid that is supplied to the anode to move to the cathode via the electrolyte membrane and produces compressed hydrogen, and
   an area of a region surrounded by the second seal material is larger than an area of a region surrounded by the first seal material.

2. The compression apparatus according to claim 1, further comprising a third seal material that surrounds an outer periphery of a second space in which to store the compressed hydrogen, the second space being provided between the anode end plate and the anode separator located at the first end,
   wherein an area of a region surrounded by the third seal material is larger than the area of the region surrounded by the first seal material.

3. The compression apparatus according to claim 1, wherein an area of a region surrounded by an outer edge of the second seal material is larger than an area of a region surrounded by an outer edge of the first seal material.

4. The compression apparatus according to claim 2, wherein an area of a region surrounded by an outer edge of the third seal material is larger than an area of a region surrounded by an outer edge of the first seal material.

5. The compression apparatus according to claim 1, further comprising a ring material that is adjacent to an outer edge of the second seal material and that surrounds the second seal material.

6. The compression apparatus according to claim 2, further comprising a ring material that is adjacent to an outer edge of the third seal material and that surrounds the third seal material.

7. The compression apparatus according to claim 5, wherein no ring material surrounding the first seal material is provided on an outer edge of the first seal material.

8. The compression apparatus according to claim 1, wherein a length from an inner edge to an outer edge of the second seal material is greater than a length from an inner edge to an outer edge of the first seal material.

9. The compression apparatus according to claim 2, wherein a length from an inner edge to an outer edge of the third seal material is greater than a length from an inner edge to an outer edge of the first seal material.

10. The compression apparatus according to claim 1, wherein an outer edge of the first seal material falls within an outer edge of the second seal material when seen from an angle parallel with a direction of stacking of the anode separator, the anode, the electrolyte membrane, the cathode, and the cathode separator.

11. The compression apparatus according to claim 2, wherein an outer edge of the first seal material falls within an outer edge of the third seal material when seen from an angle parallel with a direction of stacking of the anode separator, the anode, the electrolyte membrane, the cathode, and the cathode separator.

12. The compression apparatus according to claim 1, wherein an outer edge of the second seal material falls within an outer edge of the cathode separator when seen from an angle parallel with a direction of stacking of the anode separator, the anode, the electrolyte membrane, the cathode, and the cathode separator.

13. The compression apparatus according to claim 2, wherein an outer edge of the third seal material falls within an outer edge of the cathode separator when seen from an angle parallel with a direction of stacking of the anode separator, the anode, the electrolyte membrane, the cathode, and the cathode separator.

14. The compression apparatus according to claim 1, wherein the first seal material and the second seal material are O-rings.

15. The compression apparatus according to claim 2, wherein the first seal material, the second seal material, and the third seal material are O-rings.

16. The compression apparatus according to claim 1, wherein
the first seal material is disposed in a groove formed in the cathode separator.

17. The compression apparatus according to claim 2, wherein further comprising
a second plate provided between the anode end plate and the anode separator positioned at the first end,
wherein the second space is formed by a recess formed in the second plate, and
the third seal material is disposed in a groove formed in a periphery of the recess.

18. A compression apparatus comprising:
a plurality of compression units stacked in a stacking direction and including a first end unit at a first end in the stacking direction and a second end unit at a second end opposite to the first end in the stacking direction, each of the first end unit and the second end unit including an electrolyte membrane, an anode provided on a first principal surface of the electrolyte membrane, a cathode provided on a second principal surface of the electrolyte membrane, an anode separator provided on the anode, and a cathode separator provided on the cathode;
a voltage applier that applies a voltage between the anode of the second end unit and the cathode of the first end unit;
an anode end plate provided on the anode separator of the second end unit;
a cathode end plate provided on the cathode separator of the first end unit;
a first seal material that surrounds an outer periphery of the cathode of the first end unit;
a second seal material that surrounds an outer periphery of a first space in which compressed hydrogen is stored, the first space being provided between the cathode end plate and the cathode separator of the first end unit, the first space being provided at a position facing to the cathode separator; and
a first plate provided between the cathode end plate and the cathode separator of the first end unit, wherein:
the first space is a recess formed in the first plate and facing the cathode separator of the first end unit,
the second seal material is disposed in a groove formed in the first plate at a periphery of the recess,
the compression apparatus causes, by using the voltage applier to apply a voltage, protons taken out from an anode fluid that is supplied to the anode of the second end unit to move to the cathode of the first end unit via the electrolyte membrane and produces compressed hydrogen, and
an area of a region surrounded by the second seal material is larger than an area of a region surrounded by the first seal material.

* * * * *